(12) United States Patent
Schlichting et al.

(10) Patent No.: US 10,820,530 B2
(45) Date of Patent: Nov. 3, 2020

(54) BALE FORMING SYSTEM AND METHOD WITH A FOLDABLE BALE CARRIER

(71) Applicant: LELY PATENT N.V., Maassluis (NL)

(72) Inventors: Malte Cornelius Schlichting, Hillerse (DE); Jürgen Borchers, Wolfenbüttel (DE)

(73) Assignee: LELY PATENT N.V., Maassluis (NL)

( * ) Notice: Subject to any disclaimer, the term of this patent is extended or adjusted under 35 U.S.C. 154(b) by 5 days.

(21) Appl. No.: 16/465,814

(22) PCT Filed: Nov. 24, 2017

(86) PCT No.: PCT/EP2017/080366
§ 371 (c)(1),
(2) Date: May 31, 2019

(87) PCT Pub. No.: WO2018/099821
PCT Pub. Date: Jun. 7, 2018

(65) Prior Publication Data
US 2020/0022310 A1   Jan. 23, 2020

(51) Int. Cl.
*A01F 15/08* (2006.01)
*A01F 15/07* (2006.01)

(52) U.S. Cl.
CPC ........ *A01F 15/0883* (2013.01); *A01F 15/071* (2013.01); *A01F 2015/0735* (2013.01)

(58) Field of Classification Search
CPC ... A01D 90/10; A01D 90/105; A01F 15/0875; A01F 15/0883; A01F 15/08
See application file for complete search history.

(56) References Cited

U.S. PATENT DOCUMENTS

| | | | | |
|---|---|---|---|---|
| 4,074,623 | A | * | 2/1978 | White ................... A01F 15/145 100/19 R |
| 4,685,270 | A | * | 8/1987 | Brambilla ............... B65B 11/04 53/176 |
| 4,790,125 | A | * | 12/1988 | Merritt, III ......... A01F 15/0715 226/176 |

(Continued)

FOREIGN PATENT DOCUMENTS

| | | |
|---|---|---|
| EP | 0 983 720 A1 | 3/2000 |
| EP | 1 481 582 A1 | 12/2004 |

(Continued)

OTHER PUBLICATIONS

European Patent Office, Search Report and Opinion prepared for Priority Application No. NL20170909.

(Continued)

*Primary Examiner* — Gloria R Weeks

(57) ABSTRACT

A bale forming system and method including a bale forming apparatus that forms a round bale in a bale forming chamber. The formed bale is ejected out of the bale forming chamber and drops onto a bale carrier. The bale carrier with the bale is moved away from the bale forming apparatus. The bale on the bale carrier is positioned on a bale carrier bottom and between two guiding sheets. The guiding sheets can be folded together and unfolded such that their vertical dimensions are varied. The guiding sheets are unfolded when the bale carrier is moved into the bale depositing position.

38 Claims, 11 Drawing Sheets

(56) References Cited

U.S. PATENT DOCUMENTS

| | | | | |
|---|---|---|---|---|
| 4,841,851 A * | 6/1989 | Quataert | A01F 15/0705 | 100/5 |
| 5,129,208 A * | 7/1992 | Van Zee | A01F 15/0715 | 53/118 |
| 5,129,215 A * | 7/1992 | Gratton | A01F 15/071 | 53/118 |
| 5,701,723 A * | 12/1997 | Simpson | A01F 15/005 | 53/435 |
| 5,740,662 A * | 4/1998 | Royneberg | A01F 15/071 | 53/211 |
| 5,822,967 A * | 10/1998 | Hood | A01F 15/071 | 56/341 |
| 6,240,712 B1 | 6/2001 | Meijer | | |
| 6,513,307 B1 * | 2/2003 | Lucas | A01F 25/14 | 53/459 |
| 6,758,028 B1 * | 7/2004 | Underhill | A01F 15/071 | 53/118 |
| 6,840,023 B2 * | 1/2005 | Roth | A01F 15/07 | 53/116 |
| 6,901,719 B2 * | 6/2005 | Viaud | A01F 15/071 | 53/118 |
| 7,013,625 B2 * | 3/2006 | Curles | B65B 43/267 | 53/261 |
| 7,156,015 B2 * | 1/2007 | McHale | A01F 15/071 | 100/177 |
| 7,197,979 B2 * | 4/2007 | Derscheid | A01F 15/0833 | 100/87 |
| 8,091,326 B2 * | 1/2012 | McHale | A01F 15/071 | 53/588 |
| 8,230,663 B2 * | 7/2012 | Viaud | A01F 15/071 | 53/116 |
| 8,322,119 B2 * | 12/2012 | Reijersen Van Buuren | A01F 15/071 | 53/587 |
| 8,794,136 B2 * | 8/2014 | Dumarey | A01F 15/0875 | 100/35 |
| 8,978,549 B2 * | 3/2015 | Thompson | A01F 15/07 | 100/88 |
| 8,978,550 B2 * | 3/2015 | Demon | A01F 15/0875 | 100/188 R |
| 9,185,846 B2 * | 11/2015 | Dumarey | A01F 15/0875 | |
| 9,408,349 B2 * | 8/2016 | Reijersen Van Buuren | A01F 15/071 | |
| 9,706,700 B2 * | 7/2017 | Lammerant | A01B 73/04 | |
| 9,877,433 B2 * | 1/2018 | Kraus | A01D 85/005 | |
| 9,930,835 B2 * | 4/2018 | Reijersen Van Buuren | B65B 11/008 | |
| 10,306,837 B2 * | 6/2019 | Jones | A01D 85/005 | |
| 10,306,838 B2 * | 6/2019 | Jones | A01D 85/005 | |
| 10,433,488 B2 * | 10/2019 | Jones | A01D 90/083 | |
| 10,470,374 B2 * | 11/2019 | Kraus | A01F 15/0765 | |
| 2011/0005410 A1 * | 1/2011 | Horstmann | A01F 15/14 | 100/6 |
| 2016/0255777 A1 * | 9/2016 | Biebuyck | A01F 15/0875 | |

FOREIGN PATENT DOCUMENTS

| | | |
|---|---|---|
| EP | 1 726 204 A1 | 11/2006 |
| GB | 2 337 245 A | 11/1999 |

OTHER PUBLICATIONS

European Patent Office, International SR and Opinion for PCT Application No. PCT/EP2017/080366, dated Feb. 7, 2018.

* cited by examiner

US 10,820,530 B2

BALE FORMING SYSTEM AND METHOD WITH A FOLDABLE BALE CARRIER

FIELD OF THE INVENTION

The invention refers to a bale forming system and to a method for forming a bale from loose material, in particular a round-cylindrical bale from loose agricultural crop material, and moving the formed bale away from the bale forming device. In particular the invention refers to an agricultural baler-wrapper combination and to a method for forming and wrapping a bale from loose material, in particular a round-cylindrical bale from loose agricultural crop material. Such a combination forms under pressure a bale in a bale forming chamber, ejects the bale, and wraps the bale outside of the bale forming chamber into wrapping material, preferably plastic film. While the bale is wrapped, it is carried on a bale supporting device positioned outside of the bale forming chamber. In order to wrap the bale, the formed and ejected bale has to be transferred from the bale forming chamber onto the bale supporting device.

BACKGROUND OF THE INVENTION

Several proposals how to transfer a formed bale from the bale forming chamber onto the bale supporting device of a bale wrapping apparatus have been made.

EP 0983720 B1 discloses an agricultural vehicle comprising a round baler (Rundballenpresse 1) and a wrapping device (Wickelvorrichtung 11). A frame (Tragrahmen 4) of a chassis (Fahrwerk 5) carries the round baler 1 and the wrapping device 11. A bale to be wrapped is moved from the round baler 1 onto a wrapping table (Wickeltisch 21) of the wrapping device 11. A chain drive 22 rotates several traversal rods which in turn rotates the bale being on the wrapping table 21. A cantilever arm (Auslegearm 16) carries two film dispensers (Folienspender 18, 19). The bale to be wrapped is moved from the round baler 1 onto the wrapping table 21 by means of a receiving fork (Auffanggabel 28) comprising lateral guiding rods (seitliche Führungsstange 29). This receiving fork 28 can be rotated around a horizontal axis 30 perpendicular to the travelling direction, cf. FIG. 6.

EP 1726204 B1 discloses a baler-wrapper combination (Press-Wickel-Kombination 1) with a round baler (Rundballenpresse 2) and a bale wrapper (Ballenwickeleinrichtung 3). A round bale 13 is formed in the pressing chamber of the round baler 2. After the bale 13 is finished, the tailgate 12 of the baler 2 is opened and the bale 13 drops onto a transfer table (Übergabetisch 7), cf. FIG. 1 and FIG. 2. A transfer bracket (Übergabebügel 9) is pivoted upwards from a parking position (Grundstellung S1) into a raised position S2, cf. FIG. 2 and FIG. 3. A hydraulic cylinder 15 causes the movement of the transfer bracket 9. The transfer bracket 9 comprises an idler roller 16 mounted at a traversal bar. The upward movement of the transfer bracket 9 causes the idler roller 16 to touch the bale's circumferential surface and to move the bale 13 from the transfer table 7 onto the wrapping table (Wickeltisch 17). Afterwards the transfer bracket 9 is moved into an intermediate position S3, cf. FIG. 3. In this position S3 the transfer bracket 9 prevents the undesired event that the bale 13 on the wrapping table 17 rolls backwards towards the transfer table 7. In an alternative embodiment the transfer bracket 9 comprises several pivoting arms (Schwenkarme 26) which can be folded together.

FIG. 1 of EP 1266563 B1 shows a combination comprising a round baler 1 and a wrapper 3. A wrapping table 13 of the wrapper 3 may be tilted forwards and backwards around a horizontal axis 12 perpendicular to the travelling direction TD. A round bale 9 is transferred from the round baler 1 to the wrapper 3 by means of two chute devices 20, 21, cf. FIG. 1, FIG. 3, and FIG. 4. The first chute device 20 comprises two parallel ramps 26, cf. FIG. 2. The second chute device 21 comprises a bracket (stirrup) 46 with two longitudinal curved struts 47, cf. FIG. 3 and FIG. 4. An ejected bale 9 drops out of the pressing chamber onto the first chute device 20 and rolls over the ramps 26 onto the stirrup 46 of the second chute device 21, cf. FIG. 4. The stirrup 46 is pivoted and lifts the bale 9 onto the wrapping table 13, cf. FIG. 5.

WO 9014756 A1 discloses a combination comprising a tractor 12, a baler 11, and a wrapper 10, cf. FIG. 1. A turntable 16 is mounted on the main frame 13 of the wrapper 10 and rotates a bale to be wrapped, cf. FIG. 2. A round bale is transferred as follows from the baler 11 onto the main frame 13 of the wrapper 10: A discharged round bale drops onto a guide 22 and rolls away from the baler 11. A mechanism 23 grips the bale, raises the bale and transfers the bale rearwardly. The bale falls under gravity onto the turntable 16. This gripping mechanism 23 comprises a cradle with a base 25 and a pair of pivotal gripper arms 26, cf. FIG. 1. In order to grip a bale, the gripper arms 26 can rotate around vertical pivot axes 27. The cradle 25 can be pivoted around a horizontal pivot axis 28, cf. FIG. 2.

FIG. 1 to FIG. 3 of EP 0543145 B1 show a wrapper for round bales (Rundballenwickelgerät 1) which can be connected with a baler (Presse 21). A wrapping table (Wickeltisch 31) with two driven rollers 41 rotates a round bale 20 to be wrapped. A loading device in the form of a bale loading bracket (Ballenladebügel) 11 can be pivoted around a horizontal axis 12, cf. FIG. 1 and FIG. 2. A hydraulic actuator (Hydrobeweger 13) can pivot the bracket 11 upwardly, cf. FIG. 1 and FIG. 5. A round bale 20 which is ejected out of the pressing chamber rolls onto the bracket 11 which is lowered down. The actuator 13 lifts the bracket 11 with the bale 20 in the direction of the arrow 37, cf. FIG. 5. The round bale is moved against the rollers 41 of the tilted wrapping table 31. Afterwards the wrapping table 31 is pivoted back into a horizontal position. By the movement of the wrapping table 31 and the further pivoting of the bracket 11 the round bale 20 is pivoted into a wrapping position 42, cf. FIG. 6. Later the wrapping table 31 is pivoted backwards and the wrapped bale drops onto a tilting unit, cf. FIG. 7. The wrapper (Umhüllvorrichtung 1) of EP 1481582 A1 comprises a loading device (Ladeeinrichtung 11) which is used if the wrapper is operated as a stationary device (für den stationären Betrieb der Umhüllvorrichtung 1). A round bale 17 is placed on the loading device 11 by means of a front-end loader (Frontlader). For moving the wrapper 1 the loading device can be pivoted around the bar (Querrohr 20) into a transport position 27.

SUMMARY OF THE INVENTION

A problem solved by the invention is to provide a bale forming system with the features of the preamble of claim 1 and a bale forming method with the features of the preamble of claim 30 wherein the risk is further reduced that a bale glides laterally from the bale carrier bottom, i.e. in a direction perpendicular to the direction in which the bale carrier with the bale is moved into the bale depositing position, without significantly reducing the performance.

This problem is solved by a bale forming system with the features of claim 1 and by a bale forming method with the features of claim 30. Preferred embodiments are specified in the depending claims.

The bale forming system according to the invention comprises a bale forming apparatus and a bale carrier. The bale carrier comprises a bale carrier bottom and a pair with two guiding sheets. Every guiding sheet of the pair is positioned angularly above the bale carrier bottom. The bale carrier can carry a bale which is on the bale carrier bottom and between the guiding sheets of the pair.

Every guiding sheet of the pair comprises at least one movable guiding sheet part. Every movable guiding sheet part is movable with respect to the bale carrier bottom between a lowered position and at least one raised position. The vertical dimension of the bale carrier with every movable guiding sheet part of the pair being in the lowered position is smaller than the vertical dimension when every movable guiding sheet part of the pair is in the or one raised position. As usual the term "vertical dimension" denotes a dimension in a direction pointing towards the center of the Earth.

The bale forming system is operated as follows and the bale forming method comprises the following steps:

The bale forming apparatus forms a bale in the provided bale forming chamber.

The formed bale is ejected out of the bale forming chamber.

The ejected bale drops or otherwise moves onto the bale carrier being in the bale receiving position.

The bale carrier carrying the bale between the guiding sheets is moved from the bale receiving position into the bale depositing position.

The bale carrier being in the bale depositing position causes the bale to move from the bale carrier and in a direction away from the bale forming apparatus.

While the bale is carried on the bale carrier and while the bale carrier with the bale is moved, every movable guiding sheet part of the pair is in the or one raised position.

Advantages

The bale carrier carrying a bale can be moved from the bale receiving position into the bale depositing position. The moved bale carrier can move the bale away from the bale forming apparatus. The bale carrier being in the bale depositing position causes a bale to move from the bale carrier and away from the bale forming apparatus. Thereby the bale carrier helps to move a formed bale to a depositing position wherein the bale carrier is positioned between the bale forming apparatus and the depositing position. Thanks to the bale carrier the depositing position has a larger distance to the bale forming apparatus and thereby to the bale forming chamber compared with a bale forming system which does not comprise a movable bale carrier.

In general the bale forming apparatus comprises a frame and a movable discharge gate which can be moved with respect to the frame between a closed position and at least one opened position. The depositing position for the bale has a larger distance to the bale forming apparatus and in particular to the discharge gate compared with the dropping position on the bale carrier onto which the bale drops after being ejected out of the bale forming chamber. Thanks to a suitable bale carrier the discharge gate can be closed again, i.e. moved into the closed position, when the bale carrier is moved in the bale depositing position and the bale has reached the depositing position. Thanks to the movable bale carrier it is possible but not necessary to move the bale forming system away from the depositing position before closing the discharge gate.

The bale carrier being in the bale depositing position can prevent the bale from moving back towards the bale forming apparatus. Such a movement is undesired as the moved bale may inhibit the bale forming apparatus from closing the discharge gate or may hit the discharge gate.

In general the bale carrier being in the bale receiving position is positioned angularly or vertically below the discharge gate being in the or one opened position. Thereby a bale can drop out of the bale forming chamber onto the bale carrier when the discharge gate is opened. It is possible but not necessary to provide an actuator which actively ejects the formed bale out of the chamber.

According to the invention the bale is carried on the bale carrier bottom and is kept between the two lateral guiding sheets of the pair. This feature inhibits the undesired event that the bale on the bale carrier glides laterally from the bale carrier, i.e. into a direction perpendicular or angular to the direction in which the bale carrier is moved into the bale depositing position. This risk of the lateral movement occurs in particular if the bale forming system belongs to a vehicle which may be operated in a hilly environment and which may during operation be inclined or tilted around an axis parallel or angular to the travelling direction while a bale is carried on the bale carrier. When the vehicle is inclined in this manner, one guiding sheet is the lower sheet and limits the lateral movement of the bale downwards and away from the bale carrier. Therefore the feature with the guiding sheets enhances the range and area where the bale forming system can securely be operated.

According to the invention every guiding sheet of the pair comprises a part which can be moved between a lower position and at least one raised position. Thereby the vertical dimension of the bale carrier can be increased and reduced. The guiding sheets and thereby the bale carrier can be folded together (both movable guiding sheet parts are in the lowered position) or unfolded (both guiding sheet parts are in the or one raised position). When being in the unfolded state and having a larger vertical dimension the guiding sheets provide a higher operating reliability: The risk is further reduced that a bale glides laterally from the bale carrier bottom. In the case of the bale forming system belonging to a vehicle this feature further increases the range and area in which the bale forming system can be operated. As the bale forming system needs not to be moved onto a surface with low inclination for moving the ejected bale away from the bale forming apparatus, the pair of guiding sheets increases the throughput through the bale forming system.

According to the invention the bale carrier can be folded together by moving every guiding sheet part of the pair into the lowered position. When being folded together the vertical dimension of the bale carrier is reduced compared with every guiding sheet part being in the or one raised position. The risk is reduced that the discharge gate or a further movable part of the bale forming apparatus hits a guiding sheet. The flexibility of the bale forming system can be increased. The discharge gate can be opened and/or closed earlier. The bale carrier can earlier be moved back into the bale receiving position. The throughput is further increased.

Preferred Embodiments

In one embodiment at least one entire guiding sheet of the pair serves as one movable guiding sheet part, i.e. the entire guiding sheet can be moved with respect to the bale carrier bottom between the lowered and the raised positions. It is possible that the lower edge of the entire movable guiding sheet or a movable guiding sheet part being in the lowered position is below the bale carrier bottom. This implementation further reduces the vertical dimension of the bale carrier.

In a further embodiment at least one guiding sheet of the pair comprises an upper and a lower part. The lower part is positioned between the upper part and the bale carrier bottom. The upper part serves as the movable guiding sheet part and can be moved with respect to the bale carrier bottom between the lowered position and the or one raised position.

In one implementation the lower guiding sheet part is rigidly connected with the bale carrier bottom. In a further implementation the lower guiding sheet part is also movable with respect to the bale carrier bottom between a lowered position and at least one raised position. It is possible that the lower edge of the lower part is below the bale carrier bottom when the lower part is in the lowered position. Preferably the upper guiding sheet part is movable with respect to the lower part such that the guiding sheet can be folded together and unfolded in a telescopic manner.

In one implementation at least one movable guiding sheet part of the pair can be moved between the lowered and the or one raised position by pivoting the guiding sheet part around a pivoting axis. The pivoting axis of the guiding sheet part can in particular be perpendicular or parallel to the direction in which the bale carrier is moved from the bale receiving position into the bale depositing position. In the case of a bale forming system belonging to a vehicle the pivoting axis of the movable guiding sheet part can in particular be perpendicular or parallel to the travelling direction of the vehicle. If the pivoting axis is parallel to the moving direction, the width of the bale carrier, i.e. the dimension perpendicular to the moving direction, is preferably decreased when every guiding sheet part is moved into the or one lowered position. If the pivoting axis is perpendicular and if the guiding sheet comprises the movable guiding sheet part and a further sheet part, the two sheet parts preferably overlap each other at least when the movable guiding sheet part is in the lowered position.

In a further implementation the movable guiding sheet part can linearly be shifted up and down with respect to the bale carrier bottom in a vertical or angular direction, e.g. like a curtain.

Preferably one movable guiding sheet part of the pair can be moved with respect to the bale carrier bottom independently from the other movable guiding sheet part. Preferably every movable guiding sheet part can take the roll of the moved guiding sheet part.

In one implementation the movable guiding sheet part of both guiding sheets are always moved synchronously between the different positions. In a further implementation only one guiding sheet part is moved while the or every other movable guiding sheet part remains in its position with respect to the bale carrier bottom. In one embodiment of the case of a bale forming system belonging to a vehicle only one guiding sheet part is moved when the vehicle is inclined around an axis parallel or angular to the travelling direction. That guiding sheet part which belongs to the (currently) lower guiding sheet of the pair is moved into the or one raised position. The other movable guiding sheet part (currently the upper part) stays in the lowered position. The lower guiding sheet is unfolded, the upper guiding sheet is or remains folded together. This embodiment reduces the necessary movement.

In one embodiment at least one entire movable guiding sheet part or a portion of it extends in a plane which is substantially perpendicular to the upper surface which is provided by the bale carrier bottom. This embodiment provides a bale carrier with a dimension perpendicular to the moving direction of the bale carrier which is as small as possible.

In a further embodiment the entire movable guiding sheet part or a portion of it extends in a plane which is angular with respect to the provided upper surface of the bale carrier. This angular orientation can occur in the or at least one raised position or in every position of the movable guiding sheet part. Thanks to this angular orientation the distance between the upper edges of the guiding sheets of the pair is larger than the distance between the lower edges. This embodiment helps to direct an ejected and dropping bale in a proper position on the bale carrier bottom and between the guiding sheets of the pair. It is also possible that a further guiding sheet part is angular with respect to the bale carrier bottom.

In one embodiment a guiding sheet actuator can move at least one guiding sheet part, preferably every guiding sheet part of the pair, at least into the or one raised position, i.e. against the force of gravity. This embodiment makes it possible to move at least one guiding sheet part independently from other parts of the bale forming system. In one implementation the guiding sheet actuator always moves both guiding sheet parts synchronously. In a further implementation the actuator selectively moves only one guiding sheet part or only the other guiding sheet part or both parts synchronously. It is possible that the actuator also moves the guiding sheet part back into the lowered position. It is also possible that the force of gravity or a biasing device moves back the guiding sheet parts.

The movement of the bale carrier into the bale depositing position can comprise a pivotal movement and/or a linear movement.

In one embodiment a bale pusher is mounted at the bale carrier and can be moved with respect to the bale carrier at least between an adjacent position and a remote position. At least when being in the adjacent position, the bale pusher is positioned between the bale forming apparatus and a bale on the bale carrier. The distance between the bale pusher and the bale forming apparatus increases when the bale pusher is moved into the remote position. The movement of the bale pusher further helps to move a bale on the bale carrier away from the bale forming apparatus and prevents the bale from moving back.

In one embodiment the bale forming system comprises a bale transfer actuator which can move the bale carrier with the bale from the bale receiving position into the bale depositing position. Thanks to the bale transfer actuator the bale carrier and thereby the bale on the bale carrier is actively moved away from the bale forming apparatus and thereby from the bale forming chamber. This is in particular of advantage if the bale forming system is a part of a vehicle which can operate in a hilly environment. Seen in the travelling direction of the vehicle the bale carrier is positioned behind the bale forming apparatus. It may happen that the vehicle with the bale forming system has a descending inclination and the bale carrier with the ejected bale has to be moved away from the bale forming apparatus in an upward direction. When being moved into the bale depositing position, the bale carrier carrying the bale is actively moved upwards against the force of gravity. This movement is performed by the actuator. The bale carrier being in the bale depositing position prevents the bale from moving downwards towards the bale forming apparatus.

In one embodiment the bale carrier being in the bale depositing position guides and deposits the bale directly on the ground. In a further embodiment the bale carrier being in the bale depositing position moves and/or guides the bale onto a bale supporting device. This bale supporting device receives and carries the bale and later deposits the carried bale onto the ground. Preferably the bale carrier is positioned between the bale forming apparatus and the bale supporting device.

In one application the bale forming system belongs to a vehicle which is moved over ground. The bale supporting device carries the bale until the vehicle reaches a location suitable for depositing the bale at this location on the ground. If the bale is a round-cylindrical object, the location must have such a small inclination and/or the bale must be so oriented that the deposited bale does not roll downwards. In addition the location should not provide a rigid object which may damage a wrap around the deposited bale and should not have too high moisture. The bale supporting device makes it possible to move the bale forming system with a bale on the bale supporting device to a suitable depositing location while the bale forming apparatus forms a further bale. This saves time compared with a purely sequential operation.

In one application the bale supporting device belongs to a bale wrapping apparatus. The bale forming apparatus and the bale wrapping apparatus belong to a baler-wrapper combination. This bale wrapping apparatus wraps the bale while the bale is carried on the bale supporting device. At least one web of wrapping material is pulled from a reservoir and is placed on the bale's surface. In one implementation at least one reservoir with wrapping material is guided around the bale on the bale supporting device. In one implementation the bale supporting device rotates the bale on the bale supporting device around the bale's center axis. These embodiments can be combined. Preferably the entire surface of the bale on the bale supporting device is wrapped, e.g. into at least one impermeable sheet.

In one embodiment the bale supporting device always remains in the same position with respect to the bale forming apparatus. In a further embodiment the bale supporting device is movable between a bale receiving position and at least one further position. The bale supporting device being in the bale receiving position receives a bale from the bale carrier being in the bale depositing position. After having received the bale, the bale supporting device carrying the bale is moved into the or one further position. The movement of the bale supporting device can be a pivotal movement around a pivoting axis. It is possible that this pivoting axis is parallel to an axis around which the bale carrier can be pivoted. The carrier pivoting axis is positioned between the bale forming apparatus and the pivoting axis of the bale supporting device. The movement of the bale supporting device can also be a linear movement.

These and other aspects of the invention and of the preferred embodiment will be even more apparent from the detailed embodiment as described below and will be elucidated in detail there.

DETAILED DESCRIPTION OF EMBODIMENT

Figure 1:
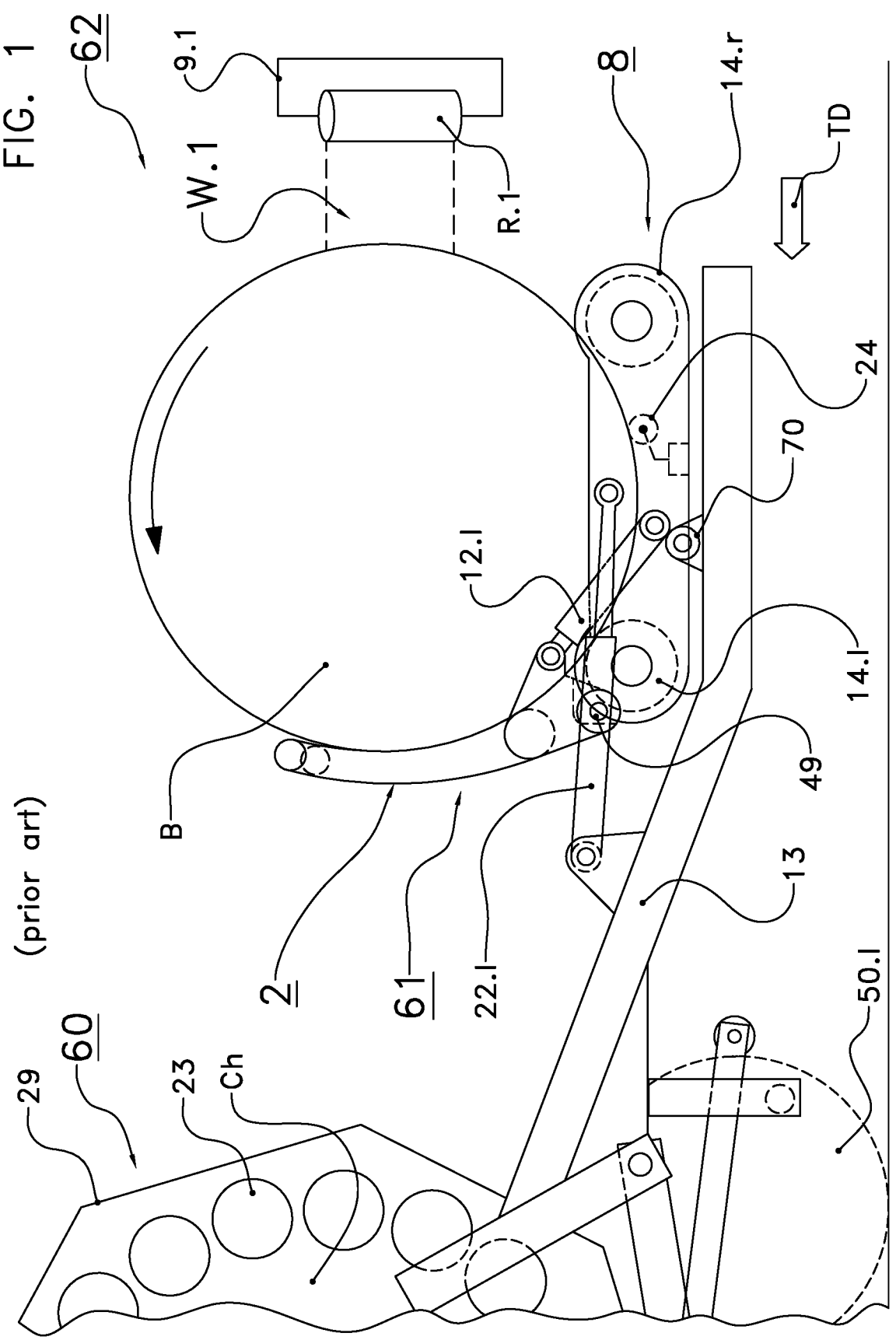
FIG. 1 shows a baler-wrapper combination according to the prior art with a bale carrier which does not comprise guiding sheets.
Figure 2:
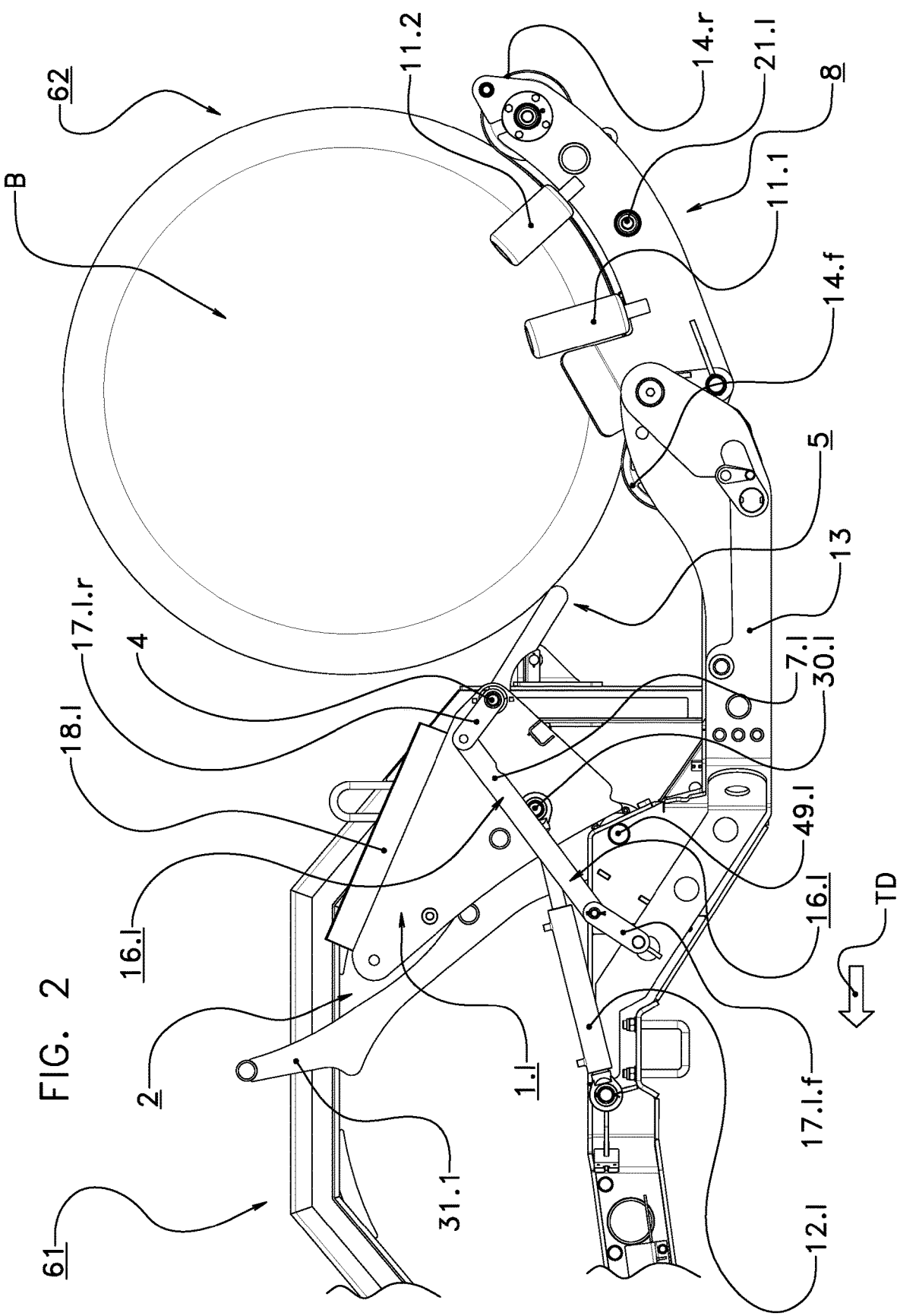
FIG. 2 shows in a side view the bale transfer unit with the bale being transferred onto the wrapping table and the bale carrier comprising guiding sheets and the bale pusher being in an intermediate position.
Figure 3:
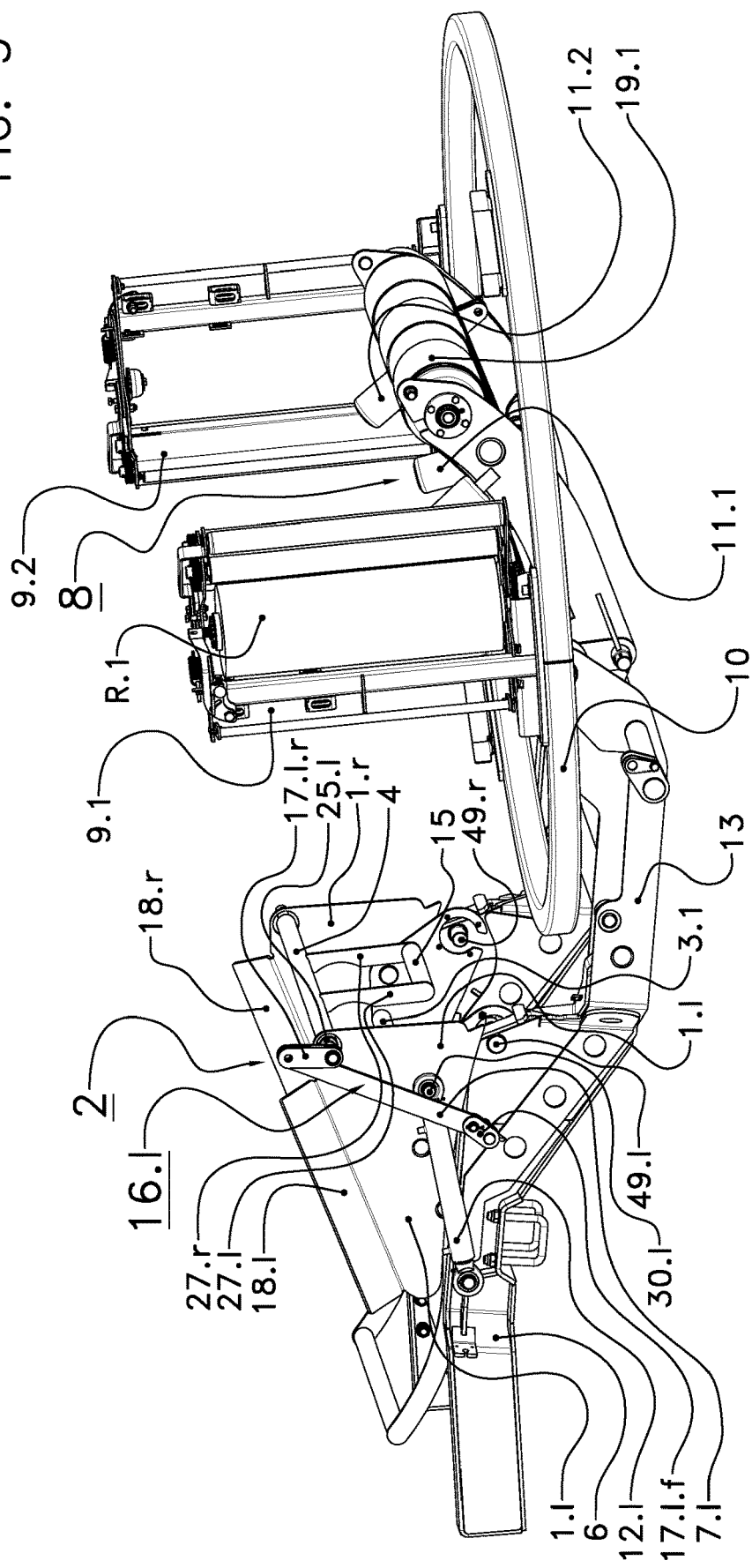
FIG. 3 shows the assembly of FIG. 2 with the bale carrier being in the bale receiving position, the bale pusher being in the adjacent position, and a part of the bale wrapping apparatus wherein the bale is omitted in the figure.
Figure 4:
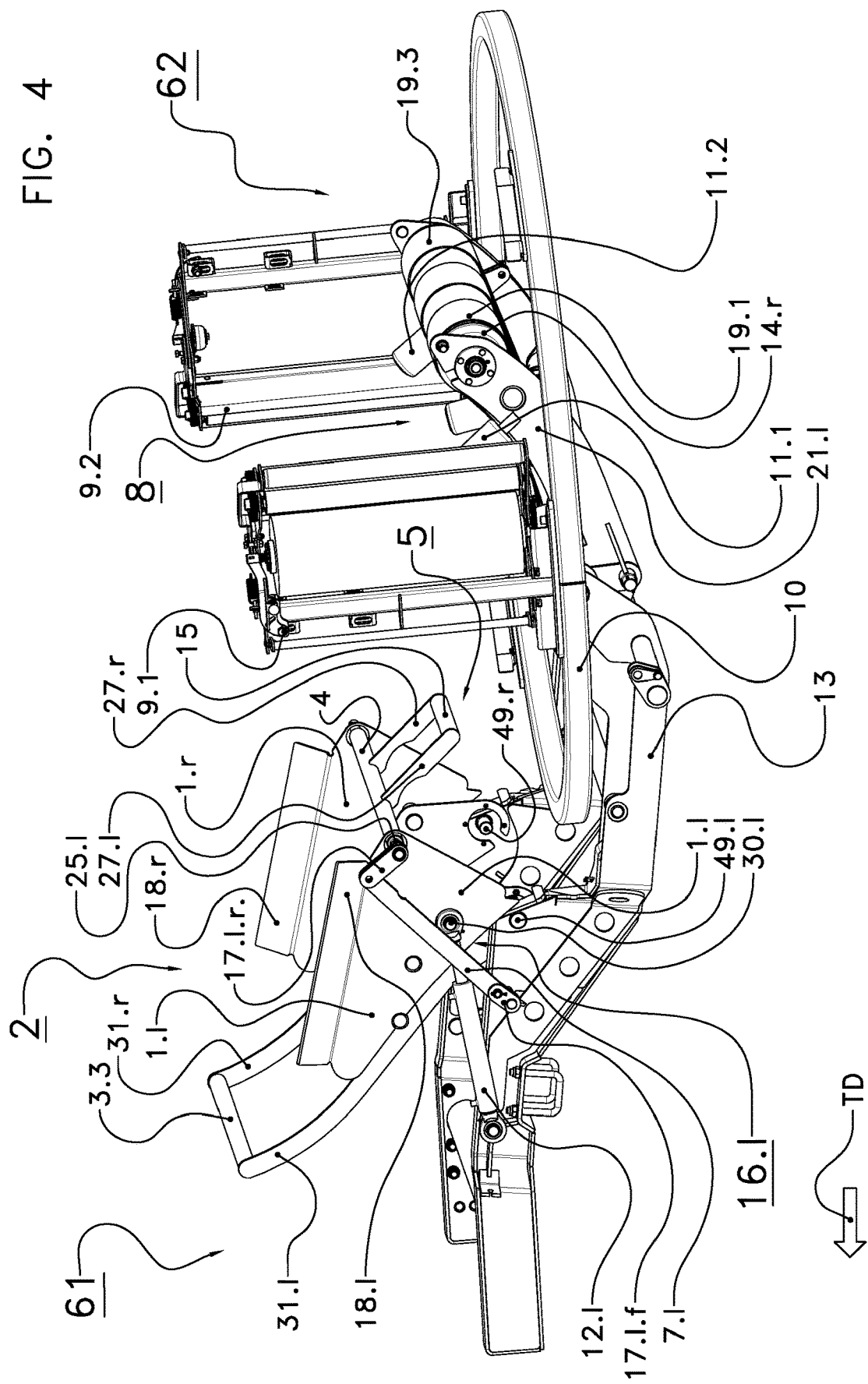
FIG. 4 shows the assembly of FIG. 2 with the bale carrier being in the bale depositing position and the bale pusher being in the remote position
Figure 5:
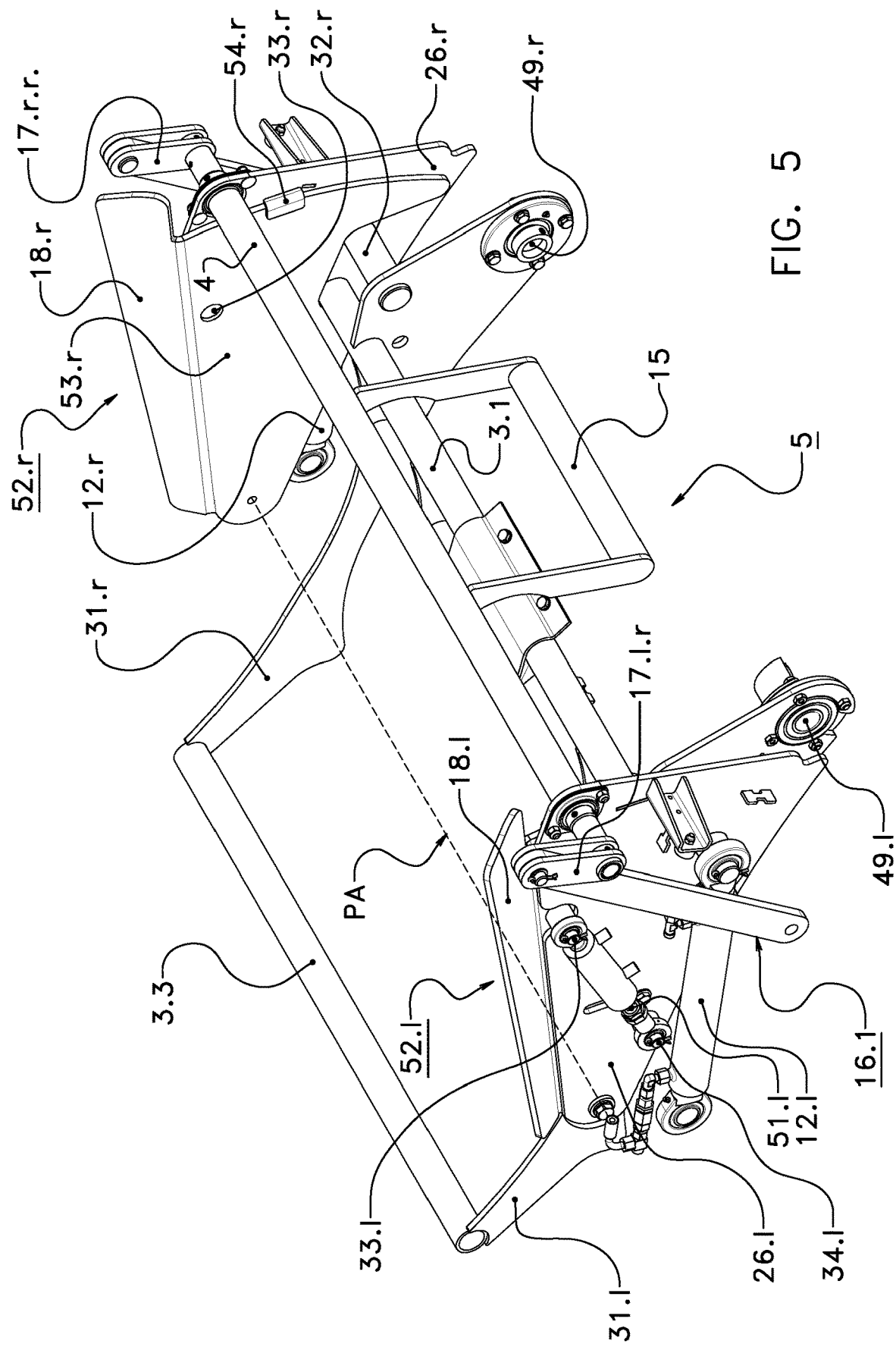
FIG. 5 shows the bale transfer unit according to a first embodiment of the invention with the pivoting axis perpendicular to the travelling direction wherein both guiding sheets are folded together.
Figure 6:
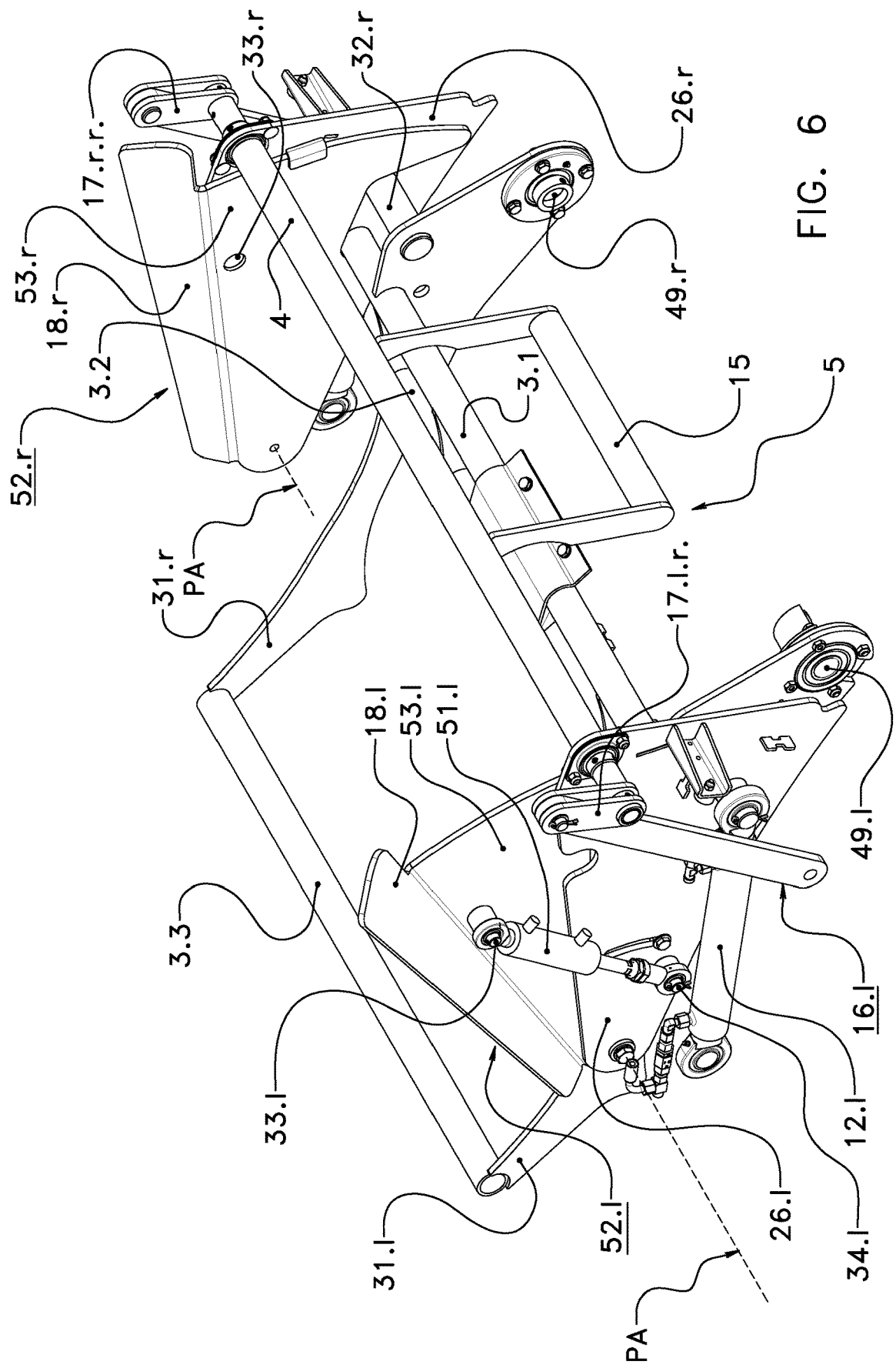
FIG. 6 shows the bale transfer unit of FIG. 5 wherein the left guiding sheet is unfolded.
Figure 7:
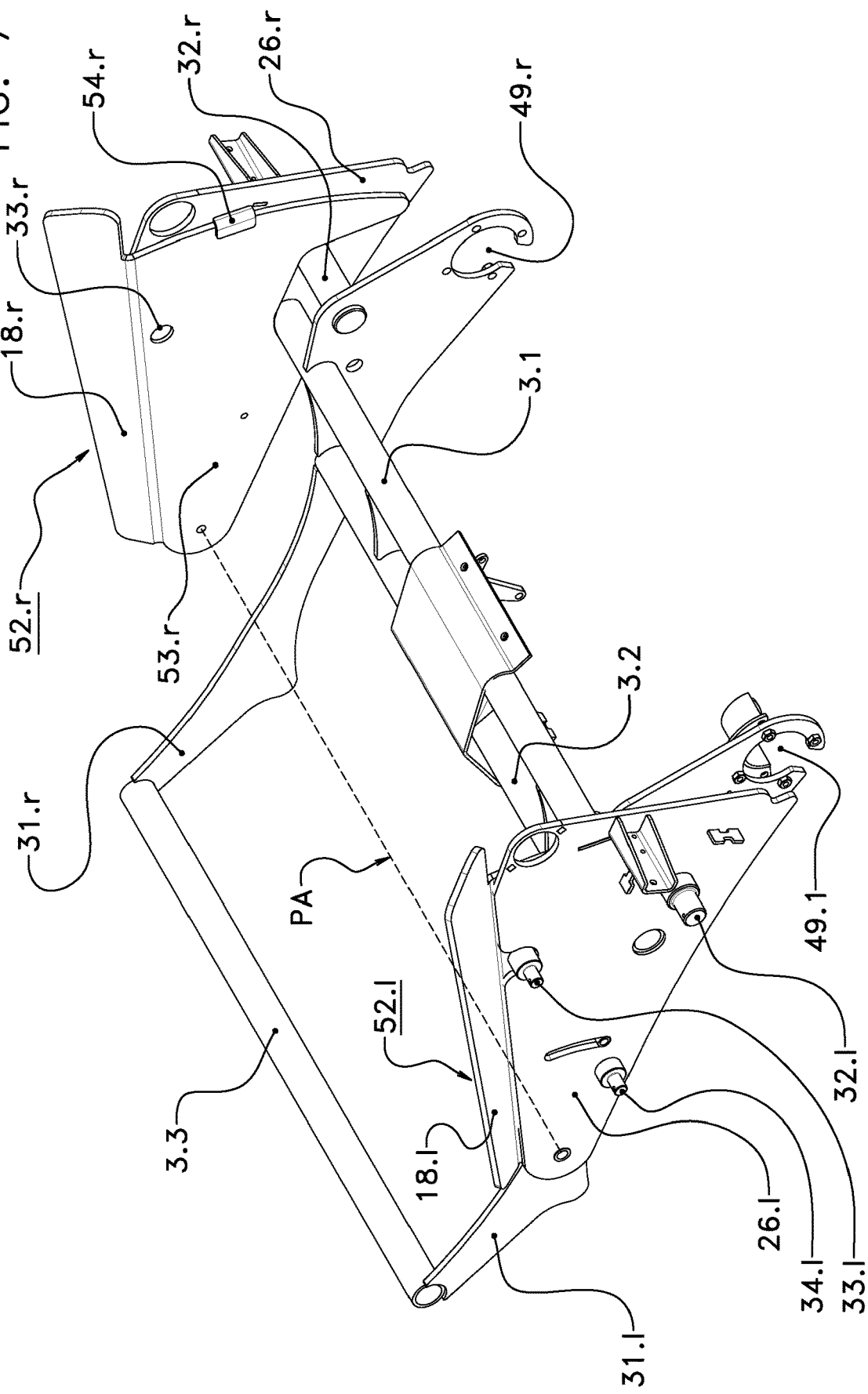
FIG. 7 shows in a detailed view some parts of the bale transfer unit of FIG. 5 wherein both guiding sheets are folded together.
Figure 8:
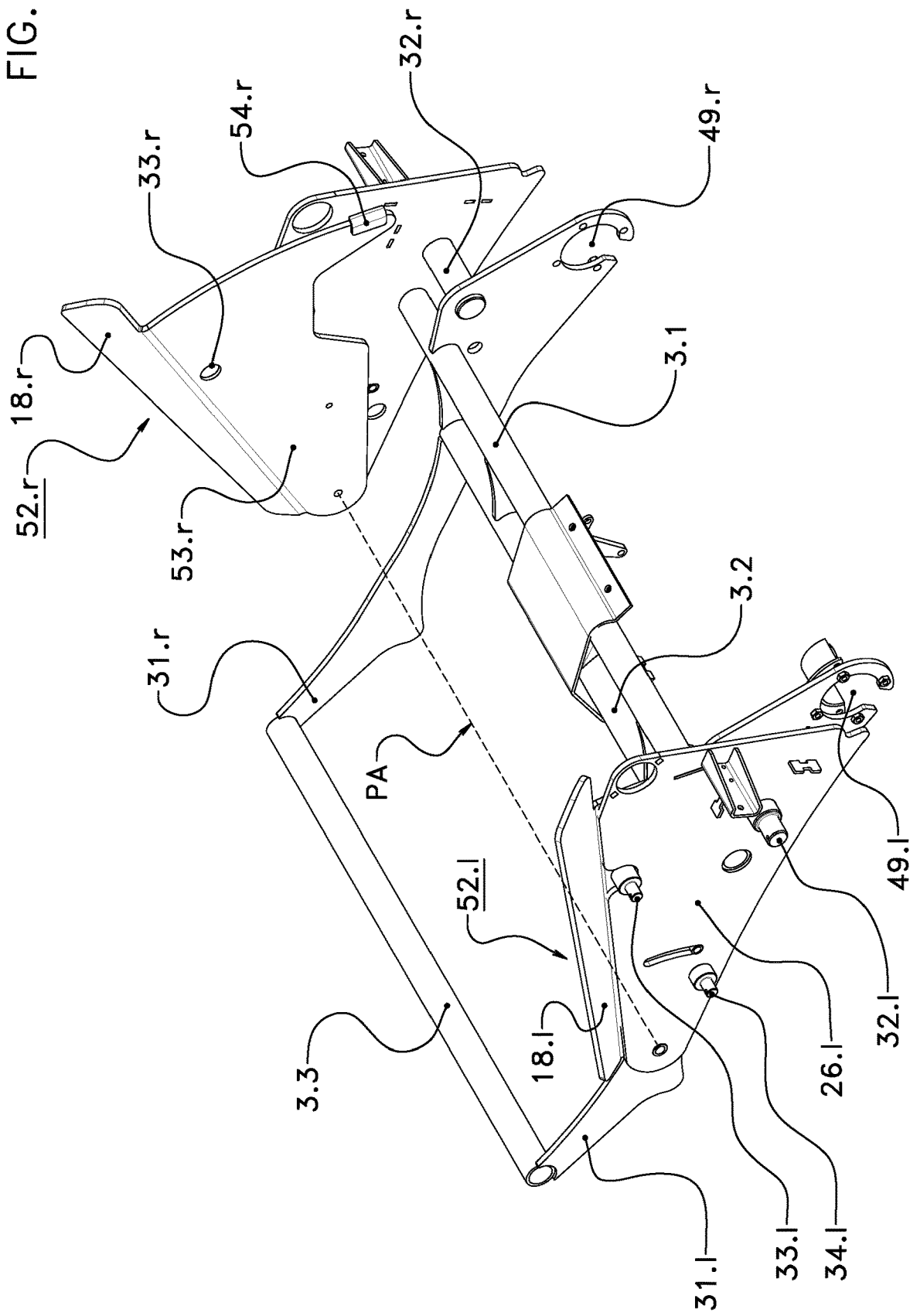
FIG. 8 shows the parts of FIG. 7 wherein the right guiding sheet is unfolded.
Figure 9:
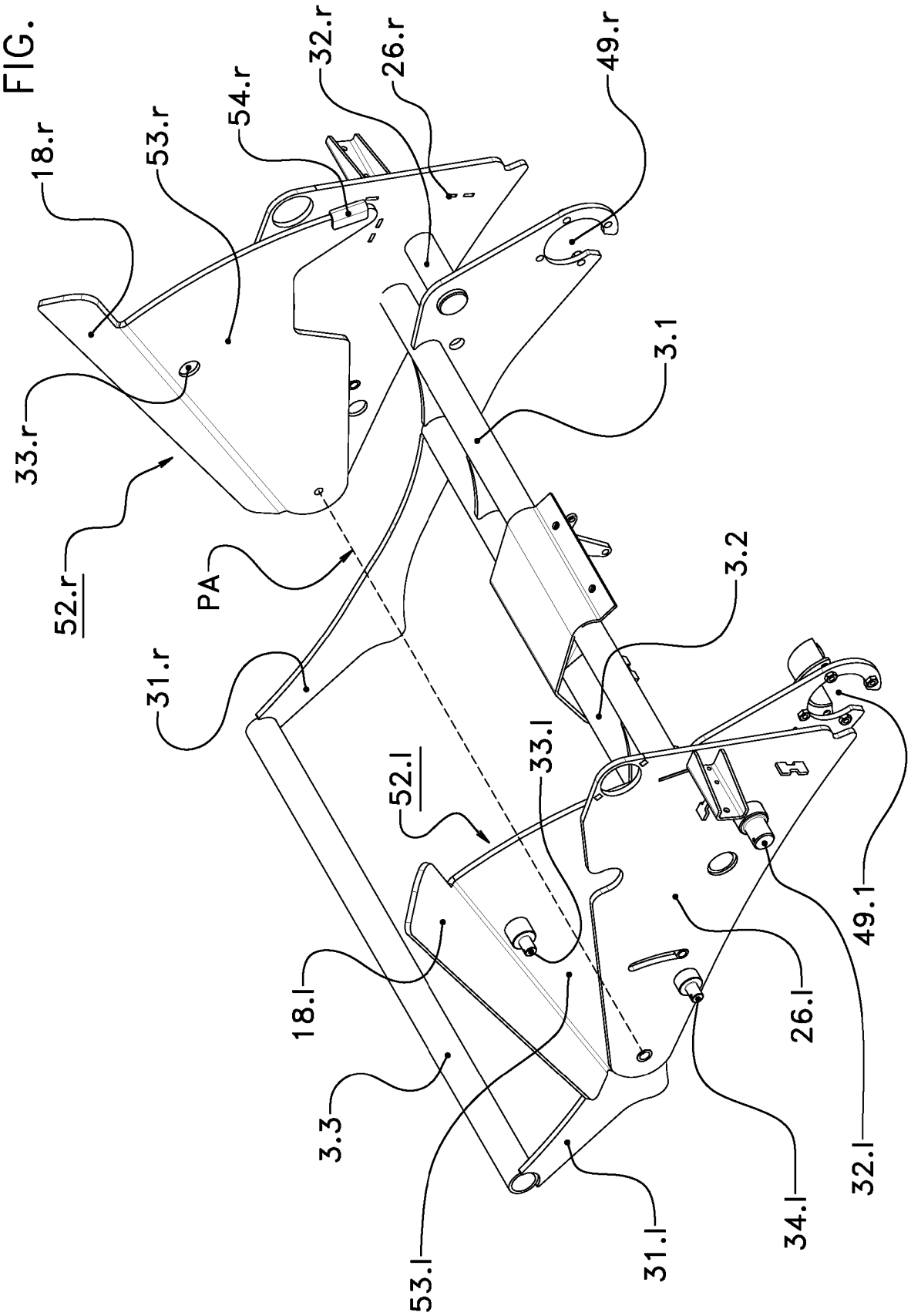
FIG. 9 shows the parts of FIG. 7 wherein both guiding sheets are unfolded.
Figure 10:
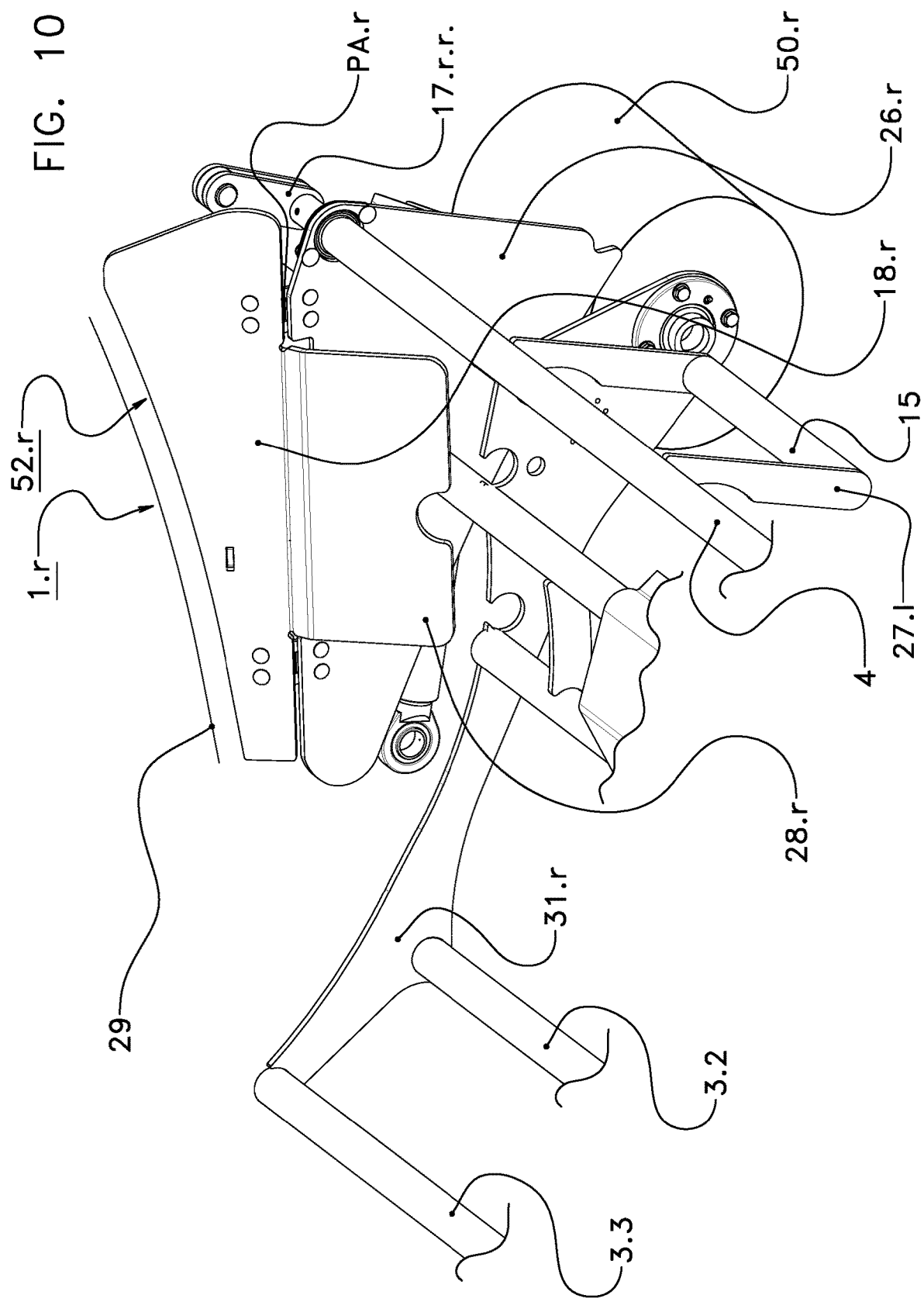
FIG. 10 shows the right guiding sheet of the bale carrier according to a second embodiment of the invention with the pivoting axis parallel to the travelling direction.
Figure 11:
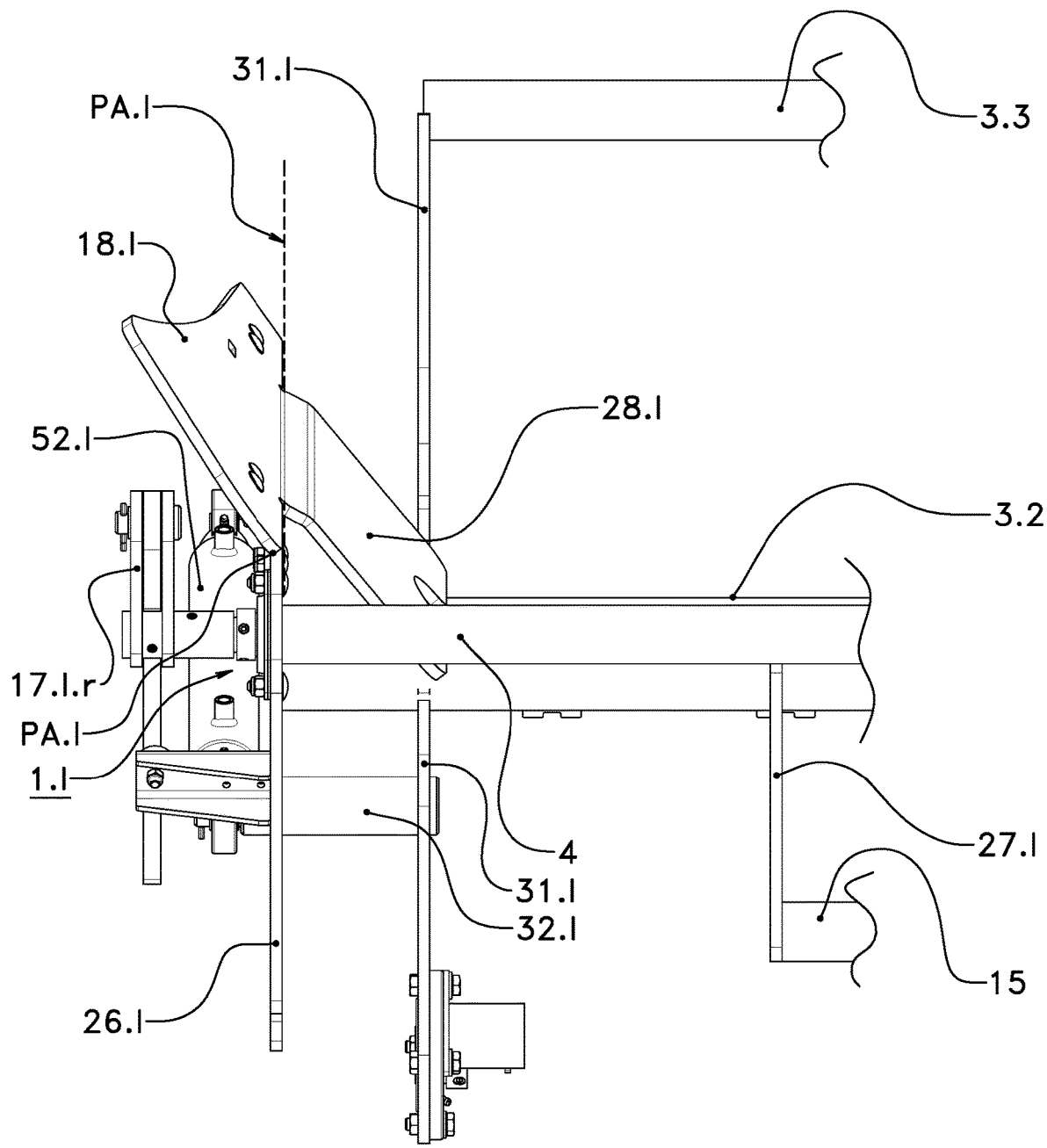
FIG. 11 shows the left guiding sheet of the bale carrier of FIG. 10.

In the embodiment the invention is used on board of a baler-wrapper combination which belongs to an agricultural vehicle and which subsequently forms and wraps round-cylindrical bales from loose crop material. FIG. 1 shows the rear part of a baler-wrapper combination according to the prior art. FIG. 2 to FIG. 4 show a baler-wrapper combination with a pair of rigid guiding sheets in which the invention can be used by amending the guiding sheets. FIG. 5 and FIG. 6 show the bale transfer unit according to a first embodiment of the invention wherein an actuator can fold together and unfold the guiding sheets and wherein the common pivoting axis of the guiding sheet is perpendicular to the travelling direction. FIG. 7 to FIG. 9 show this first embodiment in a detailed view. FIG. 10 and FIG. 11 show the bale carrier 2 of the bale carrier according to a second embodiment of the invention wherein the upper segments of the guiding sheets can be moved by means of two flaps and wherein the common pivoting axis of the guiding sheets is parallel to the travelling direction. Coinciding parts have the same reference signs.

The baler-wrapper combination according to FIG. 1 to FIG. 11 is pulled over ground in a travelling direction TD (in FIG. 1 to FIG. 4 from right to left) by a propelled vehicle, e.g. a tractor (not shown). The combination comprises
 a bale forming apparatus 60 (only shown partly in FIG. 1),
 a bale transfer unit 61 with a pivotal bale carrier 2, and
 a bale wrapping apparatus 62.

The baler-wrapper combination is carried on a chassis with two ground-engaging wheels 50.*l*, 50.*r*. The bale forming apparatus 60 and the bale carrier 2 of the bale transfer unit 61 belong to a bale forming system according to the invention.

The bale forming apparatus 60 of the embodiment is a conventional round baler and comprises a pick-up unit (not shown),
a feeding channel (not shown),
a bale forming means providing a drum-shaped bale forming chamber Ch of fixed or variable size,
a casing for the bale forming chamber Ch with a stationary front housing (not shown) and a pivotal discharge gate (tailgate) 29 (partly shown), and
a net or twine wrapping apparatus (not shown) mounted at the front housing or at the discharge gate 29.

The bale forming means comprises several pressing rollers and in one embodiment at least one pressing belt. FIG. 1 shows the rear part of the discharge gate 29 of the round baler 60 with several pressing rollers 23. The discharge gate 29 can be moved between a closed position and at least one opened position. While the bale forming means forms a bale B in the bale forming chamber Ch and while it wraps the circumferential surface of the bale B also in the bale forming chamber Ch, the discharge gate 29 is in the closed position. For ejecting the bale B out of the bale forming chamber Ch the discharge gate 29 is opened, i.e. moved into the or one opened position. In the embodiment a discharge gate actuator (not shown) can open the discharge gate 29 against the force of gravity.

In one embodiment (not shown) the bale forming apparatus 60 can subsequently form bales with different diameters and can open the discharge gate 29 in an opened position which depends on the diameter of the bale currently to be ejected.

The bale transfer unit 61 of FIG. 1 to FIG. 11 comprises
a pivotal bale carrier 2 and
a hydraulic bale transfer actuator with a left piston-cylinder device 12.*l* and a corresponding right piston-cylinder device 12.*r*.

The terms "left" and "right" refer to the travelling direction TD. The terms "horizontal" and "vertical" as well as "upper" and "lower" refer to a horizontal ground G on which the baler-wrapper combination stands—more precisely: to a direction pointing towards the center of the Earth.

The bale carrier 2 according to the embodiment comprises a pair with left and right guiding sheets 1.*l*, 1.*r* (shown in FIG. 2 to FIG. 11). Every guiding sheet 1.*l*, 1.*r* comprises
a stationary lower sheet part 26.*l*, 26.*r*,
a short connecting rod 32.*l*, 32.*r* which rigidly connects the lower sheet part 26.*l*, 26.*r* with the longitudinal support rod 31.*l*, 31.*r*
a moveable upper sheet part 52.*l*, 52.*r* with an angled upper segment 18.*l*, 18.*r* and a lower portion 53.*l*, 53.*r* (only first embodiment),
two guiding elements 54.*l*, 54.*r* (only first embodiment),
a hydraulic piston-cylinder unit 51.*l*, 51.*r* (only first embodiment),
an outwardly projecting axle 33.*l*, 33.*r*, mounted at the movable sheet part 52.*l*, 52.*r*, hingedly connected with the upper end of the piston-cylinder unit 51.*l*, 51.*r* (only first embodiment),
an outwardly projecting axle 34.*l*, 34.*r*, mounted at the stationary lower sheet part 26.*l*, 26.*r*, hingedly connected with the lower end of the piston-cylinder unit 51.*l*, 51.*r* (only first embodiment), and
a guiding flap 28.*l*, 28.*r* rigidly connected with the angled upper segment 18.*l*, 18.*r* (only second embodiment).

In particular the implementation of the guiding sheets 1.*l*, 1.*r* as shown in FIG. 4 to FIG. 11 is novel. Their operation is explained below with respect to FIG. 4 to FIG. 11. In FIG. 2 and FIG. 3 the angled upper segment 18.*l*, 18.*r* is rigidly connected with the stationary lower sheet part 26.*l*, 26.*r*, i.e.

FIG. 2 and FIG. 3 show a pair of guiding sheets but do not show an embodiment of the invention.

The bale carrier 2 according to the embodiment further comprises
three traversal bale support rods 3.1, 3.2, 3.3,
a bale support frame with a left part 31.*l* and a right part 31.*r*,
a bale pusher 4, 5,
a mechanical coupling device 16.*l*, 16.*r* for the bale pusher 4, 5, and
coaxial left and right carrier axles 49.*l*, 49.*r* defining the carrier rotating axis 49.

The bale support rods 3.1, 3.2, 3.3 are positioned between the bale support frame parts 31.*l* and 31.*r* and are rigidly or rotatably connected with both frame parts 31.*l*, 31.*r*. The lower parts 26.*l* and 26.*r* of the guiding sheets 1.*l* and 1.*r* are rigidly connected with the bale support rods 3.1, 3.2. The bale support rods 3.1, 3.2, 3.3 form a cradle, i.e. they are positioned such that a bale B on the bale carrier 2 having an average diameter touches simultaneously all three bale support rods 3.1, 3.2, 3.3. The bale support frame 31.*l*, 31.*r* and the bale support rods 3.1, 3.2, 3.3 together form a bale carrier bottom for carrying and supporting a bale. The bale carrier 2 can carry a round-cylindrical bale B on the bale support 31.*l*, 31.*r*, 3.1, 3.2, 3.3 in a position between the pair of guiding sheets 1.*l* and 1.*r*. The center axis of the bale B is parallel to the bale support rods 3.1, 3.2, 3.3 and perpendicular to the bale support frame 31.*l*, 31.*r* and to the travelling direction TD. The distance between the guiding sheets 1.*l* and 1.*r* is slightly larger than the distance between the two front faces of the round-cylindrical bale B.

FIG. 5 and FIG. 6 show the bale transfer unit 61 with the guiding sheets 1.*l*, 1.*r* according to a first embodiment of the invention. FIG. 7 to FIG. 9 show some parts of the first embodiment in a detailed view. The travelling direction is from right to left. FIG. 10 and FIG. 11 show a second embodiment. In both embodiments every guiding sheet 1.*l*, 1.*r* comprises a lower sheet part 26.*l*, 26.*r* which extends in a vertical plane and is rigidly connected with the bale support frame 31.*l*, 31.*r*. The traversal rod 4 of the bale pusher connects the lower sheet parts 26.*l* and 26.*r* with each other. In addition every guiding sheet 1.*l*, 1.*r* comprises an outwardly angled upper segment 18.*l*, 18.*r* which belongs to the movable guiding sheet part 52.*l*, 52.*r*. These outwardly angled segments 18.*l* and 18.*r* direct a dropped bale B into a center position between the guiding sheets 1.*l*, 1.*r* even if the baler-wrapper combination 60, 61, 62 is operated in a hilly area and is inclined around an axis parallel or angular to the travelling direction TD. In the first embodiment every guiding sheet 1.*l*, 1.*r* further comprises a movable upper sheet part 52.*l*, 52.*r* with a vertical movable lower portion 53.*l*, 53.*r*. The upper sheet part 52.*l*, 52.*r* can move with respect to the stationary lower sheet part 26.*l*, 26.*r* of the same guiding sheet 1.*l*, 1.*r* around a horizontal rotating axis PA. This rotating axis PA coincides for both guiding sheets 1.*l*, 1.*r* and is perpendicular to the travelling direction TD. The guiding element 54.*l*, 54.*r* is rigidly mounted at the lower sheet part 26.*l*, 26.*r* and guides the vertical movable lower portion 53.*l*, 53.*r* with respect to the lower sheet part 26.*l*, 26.*r*, cf. FIG. 7 to FIG. 9.

The lower portion 53.*l*, 53.*r* of the upper sheet part 52.*l*, 52.*r* extends in a vertical plane which is parallel to that vertical plane in which the lower sheet part 26.*l*, 26.*r* extends. In particular the guiding element 54.*l*, 54.*r* restricts the distance between the stationary lower sheet part 26.*l*, 26.*r* and the movable lower portion 53.*l*, 53.*r*. In the first embodiment the lower portions 53.*l*, 53.*r* are positioned in the space between the stationary lower sheet parts 26.*l*, 26.*r* and partially overlap with them. An aperture is cut into the lower edge of the movable lower portion 53.*l*, 53.*r*. The bale support rod 3.1 connects the stationary lower sheet parts 26.*l*, 26.*r* with each other and is guided through both apertures. When the movable sheet part 52.*l*, 52.*r* is in the lower position, it rests on the rod 3.1 and on the short connecting rod 32.*l*, 32.*r* or on a damping element mounted on the rod 3.1, 32.*l*, 32.*r*, cf. FIG. 7. In addition an outwardly projecting axle 33.*l*, 33.*r* mounted at the movable sheet part 52.*l*, 52.*r* and connected with the actuator 51.*l*, 51.*r* rests on a corresponding aperture in the upper edge of the stationary lower sheet part 26.*l*, 26.*r*.

In the first as well as in the second embodiment every outwardly angled upper segment 18.*l*, 18.*r* forms the upper portion of the movable guiding sheet part 52.*l*, 52.*r*. In the first embodiment the angled upper segment 18.*l*, 18.*r* is rigidly connected with the respective vertical movable lower portion 53.*l*, 53.*r* in a slightly ascending edge.

By pivoting the upper sheet part 52.*l*, 52.*r* with respect to the lower sheet part 26.*l*, 26.*r* around the common pivoting axis PA downwards or upwards, the guiding sheet 1.*l*, 1.*r* is folded together or is unfolded. In the first embodiment according to FIG. 5 to FIG. 9 the guiding sheet 1.*l*, 1.*r* is unfolded by pivoting the upper sheet part 52.*l*, 52.*r* anti-clockwise and is folded together by pivoting it clockwise. A hydraulic piston-cylinder unit 51.*l*, 51.*r* (only shown in FIG. 5 and FIG. 6) is pivotally connected with the stationary lower sheet part 26.*l*, 26.*r* and with the lower portion 53.*l*, 53.*r* of the movable sheet part 52.*l*, 52.*r*. When this piston-cylinder unit 51.*l*, 15.*r* expands, the respective guiding sheet 1.*l*, 1.*r* is unfolded, i.e. moved into the raised position. If the piston-cylinder unit 51.*l*, 51.*r* retracts, the guiding sheet 1.*l*, 1.*r* is folded together. The piston-cylinder units 51.*l*, 51.*r* are omitted in FIG. 7 to FIG. 9.

FIG. 10 and FIG. 11 show a second embodiment of the guiding sheets 1.*l*, 1.*r*. In the second embodiment no hydraulic piston-cylinder unit 51.*l*, 51.*r* is used for unfolding and folding the guiding sheet 1.*l*, 1.*r*. In contrast the dropped bale B itself unfolds synchronously both guiding sheets 1.*l* and 1.*r*. When no bale is on the bale carrier 2 the force of gravity folds together the guiding sheets 1.*l* and 1.*r*.

In the second embodiment the angled segments 18.*l*, 18.*r* together with two flaps 28.*l*, 28.*r* form the movable guiding sheet parts 52.*l*, 52.*r* and are hingedly connected with the stationary lower sheet parts 26.*l*, 26.*r*. The guiding flap 28.*l*, 28.*r* is rigidly connected with the angled upper segment 18.*l*, 18.*r*, is positioned in the space between the lower sheet parts 26.*l* and 26.*r*, and points towards the bale carrier bottom 31.*l*, 31.*r*, 3.1, 3.2, 3.3. The upper segment 18.*l*, 18.*r* and the flaps 28.*l*, 28.*r* are pivotal with respect to the lower sheet part 26.*l*, 26.*r* around an axis PA.l, PA.r which is substantially horizontal and substantially parallel to the travelling direction TD with a lateral offset.

As the weight of the angled upper segment 18.*l*, 18.*r* is larger than the weight of the connected flaps 28.*l*, 28.*r*, the force of gravity of the movable guiding sheet parts 52.*l*, 52.*r* tends to fold together the guiding sheets 1.*l*, 1.*r*, i.e. tends to move them into an angled position. FIG. 10 shows the right guiding sheet 1.*r* and FIG. 11 the left guiding sheet 1.*l* in the folded position.

When a bale B is ejected out of the bale forming chamber Ch and before the bale B drops onto the bale carrier 2, the moving bale B hits both guiding flaps 28.*l*, 28.*r*. This event causes the upper segments 18.*l*, 18.*r* to be pivoted towards each other such that they are in the same plane as the lower sheet parts 26.*l*, 26.*r*. Thereby the guiding sheets 1.*l* and 1.*r* are unfolded.

The bale wrapping apparatus 62 of the embodiment is a conventional wrapper for round-cylindrical bales, is shown in FIG. 1 and FIG. 2, and comprises
- a pivotal wrapping table 8,
- a wrapping apparatus frame 13 for carrying the wrapping table 8,
- a hydraulic wrapping table actuator 22.*l*, 22.*r* for pivoting the wrapping table 8 with respect to the wrapping apparatus frame 13 around a substantially horizontal wrapping table pivoting axis 70,
- a wrapping ring 10 which can rotate with respect to the wrapping table 8 and with respect to the wrapping apparatus frame 13 around a vertical axis,
- a wrapping ring drive (not shown) for rotating the wrapping ring 10 with respect to the wrapping table 8,
- two reservoir holders 9.1, 9.2 which are mounted on the wrapping ring 10 and which rotatably hold two wrapping material reservoirs (film rolls) R.1, R.2,
- optionally a path or velocity sensor 24 which measures the length of the circumference movement path or the circumferential velocity of the bale B on the wrapping table, and
- a web clamping and severing device (not shown).

The wrapping apparatus frame 13 is connected with a frame 6 for the bale forming apparatus 60. The wrapping table 8 serves as the bale supporting device and comprises
- a wrapping table frame with left and right table frame parts 21.*l*, 21.*r*,
- two driven bale supporting rollers 14.*f*, 14.*r* which are rotatably mounted between the table frame parts 21.*l*, 21.*r*,
- in the embodiment several belts 19.1, 19.2, 19.3 positioned between the table frame parts 21.*l*, 21.*r* and guided around the bale supporting rollers 14.*f*, 14.*r*,
- a drive (not shown), preferably a chain drive, for rotating at least one bale supporting roller 14.*f*, 14.*r*, and
- two lateral bobbin pairs each comprising two rotatable bobbins 11.1, 11.2, . . . .

The wrapping table actuator comprises a left piston-cylinder device 22.*l* and a corresponding right piston-cylinder device 22.*r* and can pivot the wrapping table 8 with respect to the wrapping apparatus frame 13 around the axis 70 selectively into
- a bale receiving position,
- a bale wrapping position, or
- a bale depositing position.

The baler-wrapper combination 60, 61, 62 of the embodiment operates as follows: The bale forming apparatus 60
- picks up loose crop material (hay, straw, silage, e.g.) from the ground G,
- conveys the picked-up loose material through the feeding channel into the bale forming chamber Ch,
- optionally cuts the conveyed crop material,
- forms under pressure a round-cylindrical bale B in the drum-shaped bale forming chamber Ch,
- wraps in the bale forming chamber Ch the circumferential surface of the bale B into a net or into several strands of twine,
- opens the discharge gate 29, and
- ejects the bale B, e.g. by using the force of gravity or the tension of a pressing belt or by means of a bale ejector.

The upper edge of the angled upper segment 18.*l*, 18.*r* forms the upper edge of the guiding sheets 1.*l*, 1.*r*. As long as the discharge gate 29 is closed, both guiding sheets 1.*l*, 1.*r* are folded together. The vertical dimension of the guiding sheets 1.*l*, 1.*r* folded together and therefore the distance between the upper edge of the angled upper segment 18.*l*, 18.*r* and the discharge gate 29 is smaller compared with the unfolded guiding sheets 1.*l*, 1.*r*. The trajectory which the outer edge of the discharge gate 29 follows when the discharge gate 29 is opened does not overlap with the upper edge of the angled upper segment 18.*l*, 18.*r* at least as long as the guiding sheet 1.*l*, 1.*r* is folded together. While or after the discharge gate 29 is opened, both guiding sheets 1.*l* and 1.*r* are unfolded. It is possible that the discharge gate trajectory would overlap with the guiding sheets 1.*l*, 1.*r* being unfolded. Therefore the guiding sheets 1.*l* and 1.*r* are folded together again before or while the discharge gate 29 is closed again.

In the first embodiment (FIG. 5 to FIG. 9) the hydraulic piston-cylinder units 15.*l*, 15.*r* simultaneously unfold both guiding sheets 1.*l*, 1.*r*. For doing so the piston-cylinder units 15.*l*, 15.*r* expand. This causes both upper sheet parts 52.*l*, 52.*r* to pivot around the common pivoting axis PA away from the bale carrier bottom 31.*l*, 31.*r*, 3.1, 3.2, 3.3. A control unit (not shown) controls the piston-cylinder units 15.*l*, 15.*r* to do so. In one implementation the event that the discharge gate 29 reaches the fully or selected opened position is detected and triggers the control unit such that the control unit causes the piston-cylinder units 15.*l*, 15.*r* to expand synchronously. Preferably they unfold both guiding sheets 1.*l*, 1.*r* as soon as possible, preferably as soon as the pivoted discharge gate 29 has passed the upper edges of the guiding sheets 1.*l*, 1.*r*.

According to the second embodiment both guiding sheets 1.*l*, 1.*r* remain in the folded position shown in FIG. 10 and FIG. 11 while the discharge gate 29 is opened. The ejected bale B drops onto the bale carrier bottom 31.*l*, 31.*r*, 3.1, 3.2, 3.3 of the bale carrier 2. Before reaching the bale carrier bottom 31.*l*, 31.*r*, 3.1, 3.2, 3.3, the bale B drops onto the flaps 28.*l* and 28.*r* which are in inwardly angled positions. The two front faces of the bale B move the guiding flaps 28.*l*, 28.*r* away from the baler's center axis and away from each other such that the upper segments 18.*l* and 18.*r* are pivoted upwards. The result of this movement: The upper segments 18.*l*, 18.*r* are in the same plane as the lower sheet parts 26.*l*, 26.*r*.

The following description refers to both embodiments. The bale carrier 2 is pivotal with respect to the bale forming apparatus 60 and to the bale wrapping apparatus 62. The bale carrier 2 is pivotal around the horizontal carrier rotating axis 49 being perpendicular to the travelling direction TD. Thereby the bale carrier 2 can be pivoted with respect to the bale forming apparatus 60 and with respect to the wrapping apparatus 62 between a bale receiving position (FIG. 3, FIG. 5, FIG. 6) and
a bale depositing position (FIG. 1, FIG. 4).

In the bale receiving position the bale carrier 2 is at least partially positioned below the discharge gate 29 of the bale forming apparatus 60 when the discharge gate 29 is opened. The bale B which has been ejected out of the bale forming chamber Ch drops onto the bale carrier 2 being in the bale receiving position and rests on the bale carrier bottom 31.*l*, 31.*r*, 3.1, 3.2, 3.3. The bale transfer actuator 12.*l*, 12.*r* pivots the bale carrier 2 with the bale B around the axis 49 away from the bale forming chamber Ch and against the force of gravity towards the wrapping table 8 until the bale carrier 2 reaches the bale depositing position. When the bale carrier 2 is in the bale depositing position, the bale carrier bottom 31.*l*, 31.*r*, 3.1, 3.2, 3.3 is in a tilted descending position. Thanks to the force of gravity the bale B rolls from the bale carrier 2 being in the bale depositing position onto the wrapping table 8 being in the bale receiving position.

The wrapping table 8 comprising the left and right frame parts 21.*l*, 21.*r* is mounted at the wrapping table frame 13. The wrapping table 8 can be pivoted around the horizontal axle 70 which is perpendicular to the travelling direction TD and parallel to the axis 49. Thereby the wrapping table 8 can be pivoted between the bale receiving position,
the bale wrapping position, and
the bale deposition position.

The wrapping table actuator 22.*l*, 22.*r* can pivot the wrapping table 8 with respect to the wrapping apparatus frame 13 between these three positions and
can keep the wrapping table 8 in one position also when the wrapping table 8 carries the bale B.

When the bale carrier 2 is moved into the bale depositing position, the wrapping table 8 not yet carrying the bale B is in the bale receiving position. The bale B rolls from the bale carrier 2 onto the wrapping table 8 being in the bale receiving position. The wrapping table 8 carrying the bale B to be wrapped is now pivoted into the bale wrapping position and is kept in this position. The belts 19.1, 19.2, 19.3 rotate the bale B carried on the wrapping table 8 around the bale carrier axis which is horizontal and perpendicular to the travelling direction. In addition the reservoir holders 9.1 and 9.2 with the film rolls R.1 and R.2 are moved around the rotated bale B. The entire surface of the rotated bale B is wrapped while the wrapping table 8 is in the bale wrapping position.

The round-cylindrical bale B is ejected, transferred, and positioned on the wrapping table 8 such that the bale's center axis remains substantially perpendicular to the traveling direction TD, perpendicular to the transfer direction of the bale carrier 2, and perpendicular to the drawing planes of FIG. 1 and FIG. 2. The bale supporting rollers 14.*f*, 14.*r* or the belts 19.1, 19.2, 19.3 of the wrapping table 8 rotate the bale B on the wrapping table 8 around the bale's center axis, i.e. around an axis parallel to the ground G, perpendicular to the travelling direction TD and perpendicular to the drawing plane of FIG. 1 and FIG. 2. The wrapping ring drive rotates the wrapping ring 10 with respect to the wrapping table frame 21.*l*, 21.*r* around a substantially vertical axis. The angle between the ring rotating axis and a vertical line to the center of the Earth may depend on the bale diameter. Thereby the two reservoir holders 9.1, 9.2 and also the film rolls R.1, R.2 are moved around the rotated bale B. Two film webs W.1, W.2 are pulled from the film rolls R.1, R.2 and are placed on the bale's surface. The entire surface of the rotated bale B is wrapped into several layers of plastic film. In the embodiment the sensor 24 comprising a counter roller measures the distance over which the circumferential surface of the bale B on the wrapping table 8 is moved, cf. FIG. 1.

In one implementation the sensor 24 counts the length of the path over which the circumferential surface of the rotated is bale is transported. After the required length of plastic film is placed on the bale's surface, the web clamping and severing device clamps and severs both film webs W.1, W.2. The wrapping table 8 is pivoted into the bale depositing position. The entirely wrapped bale B rolls from the wrapping table 8 in a direction opposite to the travelling direction TD onto the ground G. It is possible that a tilting unit (quarter turn), e.g. a rod with a lateral offset to the baler center plane, is positioned behind the wrapping table 8 and tilts the wrapped bale B onto a front face before the bale reaches the ground.

In the following the operation of the bale transfer unit 61 is explained in more detail. After the formed bale B is ejected out of the bale forming chamber Ch, the ejected bale B first hits the traversal rod 3.3. The rod 3.3 guides the dropped bale B onto the bale carrier 2. The bale B is carried by the three traversal bale support rods 3.1, 3.2, 3.3 of the bale carrier 2. The traversal bale support rods 3.1, 3.2, 3.3 and the longitudinal rods 31.*l*, 31.*r* together form the bottom of the bale carrier 2. The two lateral guiding sheets 1.*l*, 1.*r* are unfolded and prevent the bale B from being laterally shifted away from the bale carrier 2 even if the baler-wrapper combination 60, 61, 62 inclines around an axle being parallel or angular to the travelling direction TD. The upper edge of the movable guiding sheet part 52.*l*, 52.*r* has the maximal possible distance to the bale carrier bottom 31.*l*, 31.*r*, 3.1, 3.2, 3.3.

For pivoting the bale carrier 2, the bale support frame parts 31.*l*, 31.*r* and therefore the guiding sheets 1.*l*, 1.*r* can rotate with respect to the frame 6 around a carrier rotating axle 49 which is defined by the axles 49.*l*, 49.*r* and which is positioned at the rear lower edges of the guiding sheets 1.*l*, 1.*r*.

The bale carrier 2 forms a trough with the guiding sheets 1.*l*, 1.*r* as the trough sidewalls. At least when being unfolded every guiding sheet 1.*l*, 1.*r* has an elongated upper segment 18.*l*, 18.*r* which is outwardly angled with respect to the rest of the guiding sheet 1.*l*, 1.*r*, cf. FIG. 3 to FIG. 11. Thanks to the tapering shape of the bale carrier 2 the falling bale B is securely guided into a position between the guiding sheets 1.*l*, 1.*r* when the bale B is ejected and drops out of the bale forming chamber Ch.

The bale pusher 4, 5 comprises
a traversal bale pusher rod 4 and
a bracket 5 mounted at the traversal bale pusher rod 4.

The bracket 5 has the shape of a U and comprises a traversal bracket rod 15 being parallel to the bale pusher rod 4 and two lateral arms 27.*l*, 27.*r* carrying the bracket rod 15 between them. Therefore a distance between the bracket rod 15 and the pusher rod 4 occurs. In one implementation the traversal bracket rod 15 is implemented as an idler roller or carries an idler roller with a hollow kernel. The rod 15 itself or the idler roller on the rod 15 comes temporarily in contact with a bale B to be transferred.

In one embodiment an actuator (not shown) can pivot the bale pusher 4.5 between the adjacent and the remote position. The following implementation avoids such an actuator. In place of an actuator a mechanical coupling device transmits a movement of the bale carrier 2 onto the bale pusher 4.5. The mechanical coupling device comprises a left coupling device part 16.*l* and a right coupling device part 16.*r*. Every coupling device part 16.*l*, 16.*r* comprises a coupling rod 7.*l*, 7.*r*,
a first (lower) link 17.*l.f*, 17.*r.f*, and
a second (upper) link 17.*l.r*, 17.*r.r*.

The first link 17.*l.f*, 17.*r.f* hingedly couples the coupling rod 7.*l*, 7.*r* with the frame 6 of the combination. The second link 17.*l.r*, 17.*r.r* hingedly couples the coupling rod 7.*l*, 7.*r* with the traversal rod 4 of the bale pusher 4, 5. The second link 17.*l.r*, 17.*r.r* is rigidly connected with the bale pusher rod 4 and is hingedly connected with the coupling rod 7.*l*, 7.*r*.

A lateral and therefore horizontal distance between the coupling device parts 16.*l*, 16.*r* and the guiding sheets 1.*l*, 1.*r* of the bale carrier 2 occurs in every position of the bale carrier 2. The entire bale carrier 2 including the guiding sheets 1.*l*, 1.*r* is positioned in the space between the coupling device parts 16.*l* and 16.*r*. Thanks to the first and second links the coupling rod 7.*l*, 7.*r* can pivot with respect to the frame 6 and with respect to the traversal bale pusher rod 4. Thanks to the lateral distance the coupling device parts 16.*l*, 16.*r* do not form an obstacle against the movement of the bale carrier 2.

As can be seen in FIG. 3 to FIG. 6, the traversal bale pusher rod 4 connects the guiding sheets 1.*l*, 1.*r* and is hingedly mounted at the stationary lower portions 53.*l*, 53.*r* and near the rear edges and near the upper edges of the guiding sheets 1.*l*, 1.*r*. The bale pusher rod 4 protrudes in both lateral directions beyond the guiding sheets 1.*l*, 1.*r* of the bale carrier 2. A left bearing 25.*l* and a right bearing 25.*r* carry the bale pusher rod 4 at the bale carrier 2 and enable a rotation of the bale pusher rod 4 with respect to the bale carrier 2 around the rod axis. The bale pusher 4, 5 can only rotate with respect to the bale carrier 2 but cannot perform a further relative movement. When the bale carrier 2 is in the adjacent position (FIG. 3), the bracket 5 is preferably entirely positioned in the space between the guiding sheets 1.*l*, 1.*r*.

The coupling device parts 16.*l*, 16.*r* are outside of the bale carrier 2, i.e. the bale carrier 2 and thereby the carried bale B is positioned between the coupling device parts 16.*l*, 16.*r*. Therefore the coupling device parts 16.*l*, 16.*r* do not form an obstacle against guiding the bale B into a proper position on the bale carrier bottom 31.*l*, 31.*r*, 3.1, 3.2, 3.3 or against transferring a bale B onto the bale carrier 2 or from the bale carrier 2 onto the wrapping table 8. Thanks to the articulation with the links 17.*l.f*, 17.*r.f*, 17.*l.r*, 17.*r.r* the distance between the mounting point at the frame 6 and the traversal bale pusher rod 4 can change. This distance increases when the bale carrier 2 is moved from the bale receiving position into the bale depositing position.

FIG. 3 and FIG. 4 show the movement of the bale carrier 2 from the bale receiving position (FIG. 3) via an intermediate position into the bale depositing position (FIG. 4) and the corresponding simultaneous rotational movement of the bale pusher 4, 5 which is enforced by the moved bale carrier 2 and the mechanical coupling device 16.*l*, 16.*r*.

When the bale carrier 2 is in the bale receiving position (FIG. 3), the bale pusher 4, 5 is in the adjacent position, namely adjacent to the bale forming apparatus 60. This adjacent position is preferably taken while a bale B on the wrapping table 8 is wrapped and/or a further bale is formed in the bale forming chamber Ch or no crop material is processed. The coupling elements 16.*l* and 16.*r* are folded together (shortest distance between the mounting point at the frame 6 and the bale pusher rod 4). The bale pusher rod 4 is in its highest position and the bracket 5 is in a substantially vertical position. In this vertical position the bale pusher 4, 5 prevents a bale B on the bale supporting device (wrapping table 8) from rolling back onto the bale carrier 2.

After a bale B has dropped from the bale forming chamber Ch onto the bale carrier 2, the bale transfer actuator 12.*l*, 12.*r* pivots the bale carrier 2 with the bale B into the bale depositing position. After the bale B has moved onto the wrapping table 8 being in the bale receiving position and preferably after the wrapping table 8 with the bale B is pivoted into the bale wrapping position, the bale transfer actuator 12.*l*, 12.*r* pivots the bale carrier 2 back into the bale receiving position.

In the embodiment the bale transfer actuator 12.*l*, 12.*r* comprises left and right double-acting lateral piston-cylinder units 12.*l*, 12.*r*. The left piston-cylinder device 12.*l* is connected with the left guiding sheet 1.*l* of the bale carrier 2 in a left connecting axle 30.*l*. The right piston-cylinder device 12.*r* is connected with the right guiding sheet 1.*r* of the bale carrier 2 in a right connecting axle 30.*r*. Extracting the rods out of the cylinders causes the bale carrier 2 to be pivoted into the bale depositing position. Retracting the rods back into the cylinders causes the bale carrier 2 to be pivoted back into the bale receiving position.

After the bale B drops onto the bale carrier 2 being in the bale receiving position, the bale transfer actuator 12.*l*, 12.*r* expands and rotates the bale carrier 2 together with the bale B around the carrier rotating axis 49 into the bale depositing position. When the bale carrier 2 is moved into the bale depositing position (FIG. 4), the bale carrier 2 is pivoted away from the bale forming chamber Ch. The bottom 31.*l*, 31.*r*, 3.1, 3.2, 3.3 of the bale carrier 2 is moved from an orientation slightly declining towards the bale forming chamber Ch (FIG. 3) into an orientation significantly declining towards the wrapping table 8 (FIG. 4). As the bale pusher rod 4 is mounted near the rear edges and near the upper edges of the guiding sheets 1.*l*, 1.*r*, the bale pusher rod 4 together with the bale carrier 2 is moved from an adjacent position into a remote position with respect to the bale forming apparatus 60 and follows a trajectory which forms a part of a circle. The height over ground of the bale pusher rod 4 decreases when the bale carrier 2 is moved into the bale depositing position and when the bale carrier 2 moves the bale pusher rod 4 into the remote position.

In addition the bale pusher rod 4 is rotated with respect to the bale carrier 2 around the rod center axis when the bale carrier 2 is moved into the bale deposition position. This rotation is caused by two the coupling elements 16.*l*, 16.*r* and as the bale pusher rod 4 is rotatably mounted at the moved bale carrier 2. The distance between the mounting point at the frame 6 and the bale pusher rod 4 increases when the bale carrier 2 is rotated. In one implementation the height over ground of the bracket rod 15 decreases due to this movement. In a further implementation this height over ground increases or remains constant.

In the embodiment the bracket 5 is rigidly mounted at the rotated bale pusher rod 4. The enforced rotation of the bale pusher rod 4 causes the rigidly connected bracket 5 of the bale pusher 4, 5 to rotate around the rod 4 from a substantially vertical position (FIG. 3) into a substantially horizontal position (FIG. 4). The traversal rod 15 of the bracket 5 is rotated around the traversal rod 4 and touches the bale's circumferential surface and helps to shift the bale B from the bale carrier 2 onto the wrapping table 8. In addition the rotation of the bracket 5 can remove some debris from the wrapping table 8.

In the embodiment a bale presence sensor (not shown) detects the event that an ejected bale B drops onto the bale carrier 2 being in the bale receiving position. In one implementation this sensor comprises a movable element which is moved by the bale against the force of a biasing element. In a further implementation the bale presence sensor detects a significant increase of the carrier's weight caused by the event that the bale B drops on the bale carrier 2. The detection that a bale B is on the bale carrier 2 triggers the step that the bale transfer actuator 12.*l*, 12.*r* pivots the bale carrier 2 together with the bale B into the bale depositing position. In one implementation this detection further causes the step that the guiding sheets 1.*l*, 1.*r* are unfolded. The bale pusher 4, 5 is moved into the remote position. It bridges the gap between the bale carrier 2 and the wrapping table 8 and prevents the bale B on the wrapping table 8 from rolling back towards the bale carrier 2 (FIG. 2).

In the embodiment the bale presence sensor (not shown) further detects the event that the bale carrier 2 being in the bale depositing position does no longer carries the bale B. This event means that the bale B is now on the wrapping table 8. It is possible that a further sensor positively detects the event that a bale B is on the wrapping table 8. The detection of the event that no bale is on the bale carrier 2 and/or that a bale B is moved onto the wrapping table 8 triggers the step that the empty bale carrier 2 is moved back into the bale receiving position. The bale pusher 4, 5 is moved back into the adjacent position (FIG. 3). In one implementation this detection further causes the step that the guiding sheets 1.*l*, 1.*r* are folded together.

Reference signs used in the claims will not limit the scope of the claimed invention. The term "comprises" does not exclude other elements or steps. The articles "a", "an", and "one" do not exclude a plurality of elements. Features specified in several depending claims may be combined in an advantageous manner.

| LIST OF REFERENCE SIGNS | |
|---|---|
| 1.l | left guiding sheet of the bale carrier 2, comprises the pivotal left upper sheet part 52.l and the left stationary lower portion 53.l, mounted at the bale support rods 3.1, 3.2 |
| 1.r | right guiding sheet of the bale carrier 2, comprises the pivotal right upper sheet part 52.r and the right stationary lower portion 53.r, mounted at the bale support rods 3.1, 3.2 |
| 2 | bale carrier, comprises the guiding sheets 1.l, 1.r, the bale support frame parts 31.l, 31.r, the bale support rods 3.1, 3.2, 3.3, and the axles 49.l, 49.r |
| 3.1, | traversal bale support rods of the bale carrier 2, belongs to the bale |
| 3.2, 3.3 | carrier bottom, form a cradle |
| 4 | traversal rod of the bale pusher, rotatably mounted at the guiding sheets 1.l, 1.r of the bale carrier 2, carries the arms 27.l, 27.r |
| 5 | bale pusher bracket, rigidly mounted at the bale pusher rod 4,comprises the bracket rod 15 and the bracket arms 52.l, 52.r |
| 6 | frame of the combination 60, 61, 62 |
| 7.l | coupling rod of the left coupling element 16.l |
| 7.r | coupling rod of the right coupling element 16.r |
| 8 | wrapping table, comprises the frame parts 21.l, 21.r, the rollers 14.l, 14.r, and the belts 19.1, 19.2, 19.3, can be pivoted with respect to thewrapping apparatus frame, serves as the bale supporting device |
| 9.1, 9.2 | reservoir holders, carried by the wrapping ring 10, carry the reservoirs R.1, R.2 |
| 10 | wrapping ring, carries the reservoirs holders 9.1, 9.2, is rotated around the bale B on the wrapping table 8 |
| 11.1, 11.2, . . . | lateral bobbins mounted at the wrapping table frame 21.l, 21.r |
| 12.l | left piston-cylinder unit for pivoting the bale carrier 2, belongs to the bale transfer actuator |
| 12.r | right piston-cylinder unit for pivoting the bale carrier 2, belongs to the bale transfer actuator |
| 13 | wrapping apparatus frame for carrying the wrapping table 8 |
| 14.f | front roller of the wrapping table 8 |
| 14.r | rear roller of the wrapping table 8 |
| 15 | bracket rod of the bale pusher bracket 5, carried by the arms 27.l, 27.r, extends parallel to the traversal rod 4 |
| 16.l | left coupling device part, comprises the rod 7.l and the links 17.l.f and 17.l.r |
| 16.r | right coupling device part, comprises the rod 7.r and the links 17.r.f and 17.r.r |
| 17.l.f | first connecting link of the left coupling device part 16.l, mounted at the frame 6 |
| 17.r.f | first connecting link of the right coupling device part 16.r, mounted at the frame 6 |
| 17.l.r | second connecting link of the left coupling device part 16.l, mounted at the left connecting rod 7.l |

LIST OF REFERENCE SIGNS

| | |
|---|---|
| 17.r.r | second connecting link of the right coupling device part 16.r, mounted at the right connecting rod 7.r |
| 18.l | outwardly angled upper segment of the left guiding sheet 1.l, belongs to the moveable left upper sheet part 52.l |
| 18.r | outwardly angled upper segment of the right guiding sheet 1.r, belongs to the mounted at the moveable right upper sheet part 52.r |
| 19.1, 19.2, 19.3 | parallel belts of the wrapping table 8, guided around the rollers 14.f, 14.r |
| 21.l | left frame part of the wrapping table 8 |
| 21.r | right frame part of the wrapping table 8 |
| 22.l | left piston-cylinder unit for pivoting the wrapping table 8 |
| 22.r | right piston-cylinder unit for pivoting the wrapping table 8 |
| 23 | pressing roller of the bale forming apparatus 60, mounted at the tailgate 29 |
| 24 | path sensor, measures the distance over which the of the surface of the rotated bale B on the wrapping table 8 Is moved |
| 25.l | left bearing for the traversal bale pusher rod 4 in the left guiding sheet 1.l |
| 25.r | right bearing for the traversal bale pusher rod 4 in the right guiding sheet 1.r |
| 26.l | left lower sheet part, belongs to the left guiding sheet 1.l, rigidly connected with the left longitudinal support rod 31.l and the traversalbale support rods 3.1, 3.2, 3.3 via the left short rod 32.l |
| 26.r | right lower sheet part, belongs to the right guiding sheet 1.r, rigidly connected with the right longitudinal support rod 31.r and the traversal bale support rods 3.1, 3.2, 3.3 via the right short rod 32.r |
| 27.l, 27.r | lateral arms of the bale pusher bracket 5, carry the bracket rod 15, rigidly mounted at the traversal rod 4 |
| 28.l | pivotal left guiding flap, rigidly connected with the outwardly angled left upper segment 18.l, belongs to the moveable left upper sheet part 52.l |
| 28.r | pivotal right guiding flap, rigidly connected with the outwardly angled right upper segment 18.r, belongs to the moveable right upper sheet part 52.r |
| 29 | pivotal discharge gate (tailgate) of the bale forming apparatus 60 |
| 30.l | connecting axle for connecting the left piston-cylinder unit 12.l with the left guiding sheet 1.l |
| 30.r | connecting axle for connecting the right piston-cylinder unit 12.r with the right guiding sheet 1.r |
| 31.l | left longitudinal support rod, rigidly connected with the traversal bale support rods 3.1, 3.2, 3.3, belongs to the bale carrier bottom |
| 31.r | right longitudinal support rod, rigidly connected with the traversal bale support rods 3.1, 3.2, 3.3, belongs to the bale carrier bottom |
| 32.l | left short connecting rod, connects the left lower sheet part 26.l with the left longitudinal support rod 31.l |
| 32.r | right short connecting rod, connects the right lower sheet part 26.r with the left longitudinal support rod 31.r |
| 33.l | outwardly projecting axle, mounted at the left movable sheet part 52.l, hingedly connected with the left piston-cylinder unit 51.l |
| 33.r | outwardly projecting axle mounted at the right movable sheet part 52.r, hingedly connected with the right piston-cylinder unit 51.r |
| 34.l | outwardly projecting axle, mounted at the stationary left lower sheet part26.l, hingedly connected with the left piston-cylinder unit 51.l |
| 34.r | outwardly projecting axle, mounted at the stationary right lower sheet part 26.r, hingedly connected with the left piston-cylinder unit 51.r |
| 49 | carrier rotating axle of the bale carrier 2, defined and provided by the axles 49.l, 49.r |
| 49.l | left connecting axle for carrying the bale carrier 2 |
| 49.r | right connecting axle for carrying the bale carrier 2 |
| 50.l | left ground-engaging wheel |
| 51.l | left piston-cylinder unit for pivoting the left upper sheet part 52.l |
| 51.r | right piston-cylinder unit for pivoting the right upper sheet part 52.r |
| 52.l | moveable left upper sheet part, belongs to the right guiding sheet 1.l, comprises the outwardly angled upper segment 18.l and in one embodiment the left guiding flap 28.l |
| 52.r | moveable right upper sheet part, belongs to the right guiding sheet 1.r,comprises the outwardly angled upper segment 18.l and in one embodiment the right guiding flap 28.r |
| 53.l | lower portion of the moveable left upper sheet part 52.l |
| 53.r | lower portion of the moveable right upper sheet part 52.r |
| 54.l | guiding element for guiding the left lower portion 53.l along the left lower sheet part 26.l |
| 54.r | guiding element for guiding the right lower portion 53.l along the right lower sheet part 26.r |
| 60 | bale forming apparatus, provides the bale forming chamber Ch |
| 61 | bale transfer unit, comprises the bale carrier 2, the bale pusher 4, 5, the coupling elements 16.l, 16.r, and the bale transfer actuator 12.l, 12.r |
| 62 | bale wrapping apparatus, comprises the wrapping apparatus frame 13, the wrapping table 8, the wrapping table actuator 22.l, 22.r, the wrappingring 10, and the reservoir holders 9.1, 9.2 |
| 70 | horizontal pivoting axis of the wrapping table 8 |
| B | round-cylindrical bale to be wrapped on the wrapping table 8 |
| Ch | drum-shaped bale forming chamber provided by the bale forming apparatus 60 |
| PA | common pivoting axis of the moveable upper sheet part 52.l, 52.r (first embodiment) |
| PA.l, PA.r | pivoting axis of the moveable upper segment 18.l, 18.r (second embodiment) |
| R.1, R.2 | wrapping material reservoirs (film rolls), kept by the reservoir holders 9.1, 9.2 |
| TD | travelling direction in which the baler-wrapper combination 60, 61, 62 is moved over ground G |
| W | web of wrapping material, pulled from the film rolls R.1, R.2 |

The invention claimed is:

1. A method for forming at least one bale by using a bale forming system comprising
 a bale forming apparatus providing a bale forming chamber and
 a bale carrier,
wherein the bale carrier comprises
 a bale carrier bottom and
 a pair with two guiding sheets,
wherein the bale carrier is movable with respect to the bale forming apparatus at least between
 a bale receiving position and
 a bale depositing position,
wherein the method comprises the steps that
 the bale is formed in the provided bale forming chamber,
 the formed bale is ejected out of the bale forming chamber,
 the bale carrier being in the bale receiving position is at least partially positioned below the bale forming chamber and receives the ejected bale,
 the bale carrier carries the received bale wherein the carried bale is on the bale carrier bottom and in a position between the pair of guiding sheets,
 the bale carrier carrying the bale is moved from the bale receiving position into the bale depositing position, and
 the bale carrier bottom of the bale carrier being in the bale depositing position causes the carried bale to move away from the bale carrier and in a direction away from the bale forming apparatus,
wherein
every guiding sheet of the pair comprises at least one movable guiding sheet part which is movable with respect to the bale carrier bottom
between a lowered and
at least one raised position,
wherein the vertical dimension of the bale carrier with the movable guiding sheet part of every guiding sheet of the pair being in the lowered position
is smaller than
the vertical dimension with every movable guiding sheet part being in the or one raised position and
wherein the step that the bale carrier carrying the bale is moved into the bale depositing position is performed
with every movable guiding sheet part of the pair being in the or one raised position.

2. The bale forming method according to claim 1, wherein
at least one of the steps that
the bale is ejected or
the bale carrier receives the bale triggers the step that
every movable guiding sheet part of the pair is moved into the or one raised position.

3. The bale forming method according to claim 1, wherein
the step that the bale carrier is moved into the bale depositing position comprises the step that
the bale carrier is moved in a moving direction,
wherein the step that every movable guiding sheet part is moved into the raised position decreases the dimension of the bale carrier in a direction perpendicular to the moving direction.

4. The bale forming method according to claim 1, wherein
the bale forming apparatus comprises
a frame and
a discharge gate,
wherein the discharge gate is movable with respect to the bale forming chamber with respect to the frame between
a closed position and
at least one opened position,
wherein the bale carrier being in the bale receiving position is at least partially positioned vertically or angularly below the discharge gate being in the or one opened position,
wherein the step that the bale is formed in the bale forming chamber is performed with the discharge gate being in the closed position,
wherein the discharge gate is moved into the or one open position when or after the bale is formed,
wherein the step of ejecting the formed bale is performed with the discharge gate being in the or one opened position, and
wherein every movable guiding sheet part of the pair remains in the lowered position at least as long as the discharge gate is in the closed position.

5. The bale forming method according to claim 1, wherein
at least one movable guiding sheet part of the pair is moved into the or one raised position
triggered by the event that the discharge gate has reached the or one opened position.

6. The bale forming method according to claim 1, wherein
the bale forming system further comprises a bale supporting device arranged to carry a bale,
wherein the step that the carried bale is caused to move away from the bale forming apparatus causes the step that
the bale moves from the bale carrier onto the bale supporting device.

7. The bale forming method according to claim 6, wherein
at least one movable guiding sheet part of the pair remains in the or one raised position
until the bale is moved onto the bale supporting device.

8. The bale forming method according to claim 6, wherein
the bale supporting device is movable with respect to the bale forming apparatus between
a bale receiving position and
at least one further position,
wherein the step that the bale is caused to move away from the bale forming apparatus causes the step that
the bale (B) moves from the bale carrier onto the bale supporting device being in the bale receiving position and
wherein the further steps are performed that
the bale supporting device carrying the received bale is moved away from the bale forming apparatus into the or one further position and
at least one movable guiding sheet parts of the pair is moved from the or one raised position into the lowered position.

9. A method for forming and wrapping at least one bale by using a baler-wrapper combination comprising
a bale forming apparatus providing a bale forming chamber,
a bale carrier, and
a bale wrapping apparatus with a bale supporting device arranged to carry a bale to be wrapped,
wherein the method comprises the steps that
a bale is formed in the bale forming chamber,
the formed bale is ejected out of the bale forming chamber onto the bale carrier and is caused to move onto the bale supporting device, and
the bale wrapping apparatus wraps the bale on the bale supporting device and
wherein the steps of forming and moving the bale are performed by a method according to claim 6.

10. A bale forming system comprising:
a bale forming apparatus providing a bale forming chamber; and
a bale carrier,
wherein the bale carrier comprises:
a bale carrier bottom; and
a pair with two guiding sheets,
wherein the bale carrier is arranged to carry a bale
on the bale carrier bottom and
in a position between the guiding sheets of the pair,
wherein the bale carrier is movable with respect to the bale forming apparatus at least between
a bale receiving position and
a bale depositing position,
wherein the bale forming apparatus is arranged
to form a bale in the provided bale forming chamber and
to eject the formed bale out of the bale forming chamber,
wherein the bale carrier being in the bale receiving position is positioned at least partly below the bale forming chamber, thereby arranged to receive an ejected bale,
wherein the bale forming system is arranged to move the bale carrier carrying an ejected bale
from the bale receiving position
into the bale depositing position, and
wherein the bale carrier bottom of the bale carrier being in the bale depositing position is arranged to cause a carried bale to move away from the bale carrier and in a direction away from the bale forming apparatus,
wherein
every guiding sheet of the pair comprises at least one movable guiding sheet part
which is movable with respect to the bale carrier bottom
between a lowered position and
at least one raised position,
wherein the vertical dimension of the bale carrier with the respective movable guiding sheet part of every guiding sheet of the pair being in the lowered position
is smaller than
the vertical dimension with every movable guiding sheet part being in the or one raised position and
wherein the bale forming system is arranged to move the bale carrier carrying a bale into the bale depositing position with every movable guiding sheet part of the pair being in the or one raised position.

11. The bale forming system according to claim 10, wherein
at least one guiding sheet of the pair comprises a lower guiding sheet part which is connected with the bale carrier bottom,
wherein the lower guiding sheet part is positioned below the or one movable guiding sheet part of this guiding sheet and
wherein this movable guiding sheet part is movable with respect to the lower guiding sheet part between the lowered and the or one raised position.

12. The bale forming system according to claim 11, wherein
the lower guiding sheet part of at least one guiding sheet of the pair is pivotally connected with the or one movable guiding sheet part of this guiding sheet.

13. The bale forming system according to claim 11, wherein
both lower guiding sheet parts are rigidly connected with the bale carrier bottom.

14. The bale forming system according to claim 10, wherein
the bale forming system is arranged to move the bale carrier in a moving direction into the bale depositing position,
wherein the dimension of the bale carrier in a direction perpendicular to the moving direction is larger
when every movable guiding sheet part of the pair is in the lowered position compared with every guiding sheet part being in the or one raised position.

15. The bale forming system according to claim 10, wherein
at least one guiding sheet of the pair comprises a guiding element, wherein the guiding element of the guiding sheet is arranged to guide the movable guiding sheet part of this guiding sheet
when the movable guiding sheet part is moved with respect to the bale carrier bottom between the lowered and the raised positions.

16. The bale forming system according to claim 10, wherein
at least one guiding sheet of the pair comprises a lower guiding sheet part and an upper movable guiding sheet part,
wherein the upper guiding sheet part is movable with respect to the lower guiding sheet part between a lowered and at least one raised position and wherein the lower guiding sheet part is movable with respect to the bale carrier bottom between a lowered and at least one raised position.

17. The bale forming system according to claim 10, wherein
the bale carrier is pivotal with respect to the bale forming apparatus between
the bale receiving position and
the bale depositing position and
at least one movable guiding sheet part of the pair is pivotal with respect to the bale carrier bottom.

18. The bale forming system according to claim 17, wherein
the bale carrier is pivotal with respect to the bale forming apparatus between both positions around a carrier pivoting axis and
at least one movable guiding sheet part of the pair is pivotal around a common or respective sheet pivoting axis.

19. The bale forming system according to claim 18, wherein
the or at least one sheet pivoting axis is perpendicular to the carrier pivoting axis.

20. The bale forming system according to claim 19, wherein
the or at least one sheet pivoting axis is parallel or angular to the carrier pivoting axis.

21. The bale forming system according to claim 10, wherein
at least one guiding sheet of the pair comprises a guiding sheet flap which forms a part of or is rigidly connected with the or one movable guiding sheet part of this guiding sheet,
wherein the or every flap is positioned
above the bale carrier bottom,
in the space between the guiding sheets of the pair, and
such that an ejected bale moves the or at least one flap towards the bale carrier bottom.

22. The bale forming system according to claim 10, wherein
the bale forming system comprises a guiding sheet actuator
which is arranged to move at least one movable guiding sheet part of the pair against the force of gravity
from the lowered position
into the or one raised position.

23. The bale forming system according to claim 22, wherein
the guiding sheet actuator is further arranged to move at least one guiding sheet part of the pair
from the or one raised position
into the lowered position.

24. The bale forming system according to claim 10, wherein
the bale forming system comprises a biasing device
which tends to move at least one movable guiding sheet part of the pair into the lowered position.

25. The bale forming system according to claim 10, wherein
the bale forming system is arranged to move at least one guiding sheet part of the pair into the lowered position
triggered by the event that a bale moves or is moved away from the bale carrier being in the bale depositing position.

26. The bale forming system according to claim 10, wherein
the bale carrier comprises a conveyor which is arranged
to carry an ejected bale and
to move the carried bale away from the bale forming apparatus.

27. The bale forming system according to claim 10, wherein
the bale forming system further comprises a bale transfer actuator which is arranged to move the bale carrier carrying a bale
from the bale receiving position
into the bale depositing position.

28. The bale forming system according to claim 10, wherein
the vertical dimension of the bale carrier with every movable guiding sheet part of the pair being in the or one raised position
is larger than half of the vertical dimension of a bale on the bale carrier.

29. The bale forming system according to claim 10, wherein
the vertical dimension of the bale carrier with every movable guiding sheet part of the pair being in the lowered position
is less than
half of the vertical dimension of a bale on the bale carrier.

30. The bale forming system according to claim 10, wherein
the bale forming apparatus comprises
a frame and
a movable discharge gate,
wherein the discharge gate is movable with respect to the frame between
a closed position and
at least one opened position,
wherein the bale carrier being in the bale receiving position is at least partially positioned vertically or angularly below the discharge gate being in the or one opened position,
wherein the bale forming apparatus is arranged
to form a bale in the provided bale forming chamber with the discharge gate being in the closed position,
to move the discharge gate into the or one opened position, and
to eject the formed bale out of the bale forming chamber with the discharge gate being in the or one opened position, and
wherein the distance between the discharge gate being in the or one opened position and the bale carrier with every movable guiding sheet part of the pair being in the lowered position
is larger than the distance between the discharge gate being in this opened position and the bale carrier with every movable guiding sheet part of the pair being in the or one raised position.

31. The bale forming system according to claim 30, wherein
the bale forming system is arranged to move at least one movable guiding sheet part of the pair into the raised position
when the discharge gate is in the or one opened position.

32. The bale forming system according to claim 30, wherein
the bale forming system comprises
a discharge gate actuator and
a mechanical coupling element,
wherein the discharge gate actuator is arranged to move the discharge gate
from the closed position
into the or one opened position, and
wherein the coupling element couples
a movement of the discharge gate from the closed position into the or one opened position
with a movement of the bale carrier,
thereby moving the bale carrier into the or at least towards the bale receiving position.

33. The bale forming system according to claim 10, wherein
the bale forming system further comprises a bale pusher being moveable with respect to the bale carrier between
an adjacent position and
a remote position,
wherein the bale pusher being in the adjacent position is positioned between
the bale forming apparatus and
a bale on the bale carrier and
wherein a movement of the bale pusher
from the adjacent position
into the remote position
increases the distance between
the bale pusher and
the bale forming apparatus.

34. The bale forming system according to claim 10, wherein
the bale forming system further comprises a bale supporting device, wherein the bale supporting device is arranged to carry a bale, wherein the bale carrier is positioned between
the bale forming apparatus and
the bale supporting device, and
wherein the bale carrier being in the bale depositing position causes a bale to move onto the bale supporting device.

35. The bale forming system according to claim 34, wherein
the bale forming system comprises a bale detecting sensor which is arranged to detect the presence of a bale on the bale supporting device, wherein the bale forming system is arranged to move every movable guiding sheet part of the pair in the lowered position
triggered by the event that a bale is detected on the bale supporting device.

36. The bale forming system according to claim 34, wherein
the bale supporting device is movable between
a bale receiving position and
at least one further position,
wherein the bale forming system is arranged
to move the bale supporting device into the bale receiving position and
to move the bale carrier into the bale depositing position, thereby causing a bale to move
from the bale carrier being in the bale depositing position
into the bale supporting device being in the bale receiving position, and wherein the distance between
the bale forming apparatus and
the bale supporting device being in the or one further position is larger than
the distance between
the bale forming apparatus and
the bale supporting device being in the bale receiving position.

37. The bale forming system according to claim 36, wherein
the bale forming system is arranged to move every guiding sheet part of the pair into the lowered position when the bale supporting device is or has been moved into the or one further position.

38. A baler-wrapper combination comprising
   a bale forming system according to claim 34, and
   a bale wrapping apparatus for wrapping the bale formed in the bale forming chamber,
wherein the bale supporting device
   belongs to the bale wrapping apparatus and
   is arranged to carry a bale to be wrapped, and
wherein the bale wrapping apparatus is arranged to wrap a bale carried on the bale supporting device.

* * * * *